United States Patent
Suzuki et al.

(10) Patent No.: US 8,267,782 B2
(45) Date of Patent: Sep. 18, 2012

(54) GAME DEVICE, GAME CONTROL METHOD, AND GAME CONTROL PROGRAM

(75) Inventors: Tatsuya Suzuki, Tokyo (JP); Jun Fujiki, Fukuoka (JP); Takanori Kikuchi, Saitama (JP)

(73) Assignee: Sony Computer Entertainment Inc., Tokyo (JP)

( * ) Notice: Subject to any disclaimer, the term of this patent is extended or adjusted under 35 U.S.C. 154(b) by 110 days.

(21) Appl. No.: 12/601,541

(22) PCT Filed: Nov. 14, 2008

(86) PCT No.: PCT/JP2008/003335
§ 371 (c)(1),
(2), (4) Date: May 12, 2010

(87) PCT Pub. No.: WO2009/101663
PCT Pub. Date: Aug. 20, 2009

(65) Prior Publication Data
US 2010/0216550 A1    Aug. 26, 2010

(30) Foreign Application Priority Data

Feb. 15, 2008   (JP) ................................. 2008-035330
Mar. 11, 2008   (JP) ................................. 2008-061882

(51) Int. Cl.
*G06F 17/00* (2006.01)
(52) U.S. Cl. ....................................................... 463/32
(58) Field of Classification Search .............. 463/32–38, 463/42; 345/156; 348/39
See application file for complete search history.

(56) References Cited

U.S. PATENT DOCUMENTS

| | | | |
|---|---|---|---|
| 6,226,008 B1 | 5/2001 | Watanabe et al. | |
| 6,323,895 B1 | 11/2001 | Sata | |
| 6,500,069 B1 | 12/2002 | Ohba et al. | |
| 7,612,777 B2 * | 11/2009 | Nagata et al. | 345/473 |
| 2003/0119587 A1 | 6/2003 | Ohba et al. | |
| 2005/0215319 A1 * | 9/2005 | Rigopulos et al. | 463/32 |
| 2007/0265088 A1 * | 11/2007 | Nakada et al. | 463/37 |
| 2007/0270215 A1 | 11/2007 | Miyamoto et al. | |
| 2008/0074425 A1 | 3/2008 | Ohba et al. | |
| 2010/0160042 A1 * | 6/2010 | Otsuka | 463/32 |

FOREIGN PATENT DOCUMENTS

EP    1 583 037    10/2005
(Continued)

OTHER PUBLICATIONS

Supplementary European Search Report dated Apr. 20, 2011, from corresponding European Application No. 08 87 2435.

(Continued)

*Primary Examiner* — Ronald Laneau
(74) *Attorney, Agent, or Firm* — Katten Muchin Rosenman LLP

(57) ABSTRACT

A game device includes a shape data storage which stores data of an object disposed in a three-dimensional space, a first rendering unit which sets a point of view and a line of sight and renders the object by referencing data stored in the shape data storage, a viewpoint changing unit which receives a change instruction indicating a change of the point of view or line of sight and changes the point of view or line of sight. The viewpoint changing unit changes the point of view or line of sight to outside a predetermined range when the point of view or line of sight enters within the predetermined range.

19 Claims, 19 Drawing Sheets

FOREIGN PATENT DOCUMENTS

| | | |
|---|---|---|
| JP | 2003-22455 | 1/2003 |
| JP | 2004-220626 | 8/2004 |

OTHER PUBLICATIONS

Jun Fujiki, et al. "Objective Locative Environment: OLE Coordinate System" Jul. 19, 2007, retrieved from: http://imposs.ible.jp/fujiki/ole_coordinate_system/index.html.

Jun Fujiki, et al. "Designing and Implementing the Interactive Optical Illusion" IPSJ SIG Technical Report, Information Processing Society of Japan, Nov. 16, 2006, pp. 31-36.

International Preliminary Report on Patentability issued Aug. 17, 2010, form corresponding International Application PCT/JP2008/00335.

International Search Report and Written Opinion of the International Searching Authority dated Feb. 17, 2009, from the corresponding International Application.

Kazutaka Toyotomi. "SCEJ, Sakushi o Riyo shita Action Puzzle PSP 'Mugen Kairo', PS3 'Mugen Kairo—Jokyoku—' 'Dosureba Clear Dekirunoka?' o Kantan na Reidai de Kaisetsu" GAME Watch, Kabushiki Kaisha Impress Watch, Feb. 8, 2008, Retrieved from <http://game.watch.impress.co.jp/docs/20080208/mugen.htm> on Feb. 6, 2009.

Jun Fujiki et al. "3D Block-based Modeling Software ni Okeru Damashie Hyogen o Mochiita User Interface" Transactions of the Virtual Reality Society of Japan, The Virtual Reality Society of Japan, vol. 12, No. 3, Sep. 30, 2007, pp. 239-246.

"Sakkaku o Riyo suru Puzzle Game 'Echochrome Mugen Kairo'" Famitsu com, Enterbrain, Inc. Sep. 11, 2007, retrieved from <http://www.famitsu.com/game/coming/1209602_1407.html> on Feb. 6, 2009.

"Mugen Kairo" Shukan Fami Tsu, No. 1000, 2 Gatsu 15 Nichi special extra issue, Enterbrain, Inc. vol. 23, No. 7, National Center for Industrial Property Information and Training, Feb. 15, 2008, pp. 136-137.

Jun Fujiki "OLE Coordinate System" Oct. 6, 2006, retrieved from <http://tserve01.aid.design.kyushu-u.ac.jp/~fujiki/ole_coordinate_system/index.html>on Feb. 15, 2008.

Notification of Reason(s) for Refusal dated Jan. 31, 2012, from corresponding Japanese Application No. 2008-061882.

* cited by examiner

GAME DEVICE, GAME CONTROL METHOD, AND GAME CONTROL PROGRAM

TECHNICAL FIELD

The present invention relates to a game control technology, and in particular to a game device, a game control method, and a game control program for controlling a game in which a character is moved on an object prepared in a three-dimensional space.

BACKGROUND ART

A trick-the-eye illusionism represents a mysterious three-dimensional world not possible in reality on a two-dimensional plane, cleverly utilizing the characteristics of parallel projection transformation. For example, Escher's "Ascending and Descending" is an illusionism which represents mysterious stairs, where going around them once returns to the original position, endlessly ascending or descending by depicting staircases at different levels in actuality as if they are interconnected.

One of the inventors has conceived a completely new game utilizing the trick of the above-mentioned illusionism and has disclosed it at the following URL site.

[Non-patent Document 1] Jun Fujiki, "OLE Coordinate System", [online], Oct. 6, 2006; Jun Fujiki, [Searched on Feb. 15, 2008], The internet <URL:http://tserve01.aid.design.kyushu-u.ac.jp/~fujiki/ole_coordinate_system/index.html>

DISCLOSURE OF INVENTION

Problems to be Solved by the Invention

The inventors have conceived a technology that assures improved user-friendliness of such a new game for the players.

The present invention has been made in view of the foregoing circumstances, and a purpose thereof is to provide a game control technology that enhances the quality of entertainment.

Means for Solving the Problem

One embodiment of the present invention relates to a game control program product. This game control program product, executed by a computer, comprises the functions of: setting a point of view and a line of sight and rendering an object disposed in a three-dimensional space by referencing data stored in a storage which stores data of the object disposed in the three-dimensional space; receiving a change instruction indicating a change of the point of view or line of sight and changing the point of view or line of sight; and shifting the point of view or line of sight to outside a predetermined range when the point of view or line of sight enters within the predetermined range.

Another embodiment of the present invention relates also to a game control program product. This game control program product, executed by a computer, comprises the functions of: setting a point of view and a line of sight and rendering an object disposed in a three-dimensional space by referencing data stored in a storage which stores data of the object disposed in the three-dimensional space; and assigning any of directions parallel with three coordinate axes set in the three-dimensional space to directions allowed to be inputted by an input device that inputs a direction, respectively, and moving a pointer in the direction assigned to the inputted direction, upon receipt of an input of the direction from the input device.

Optional combinations of the aforementioned constituting elements described above, and implementations of the invention in the form of methods, apparatuses, systems and so forth may also be effective as additional modes of the present invention.

Advantageous Effects

The present invention provides a game control technology that enhances the quality of entertainment.

EXPLANATION OF REFERENCE NUMERALS

10 Game device, 20 Controller, 30 Input receiving unit, 40 Control unit, 41 Viewpoint changing unit, 42 First rendering unit, 43 Second rendering unit, 44 Character controller, 45 Search unit, 46 Cursor controller, 47 Snap controller, 48 Editing unit

BEST MODE FOR CARRYING OUT THE INVENTION

First Embodiment

A game device according to this embodiment offers a game in which a character is moved along sterical passages disposed in a three-dimensional space to a predetermined position. In a game according to the present embodiment, a character is moved by the new rules applying the trick of illusionism which are impossible in an actual three-dimensional space. The outline of the game is first explained below.

Figure 1:
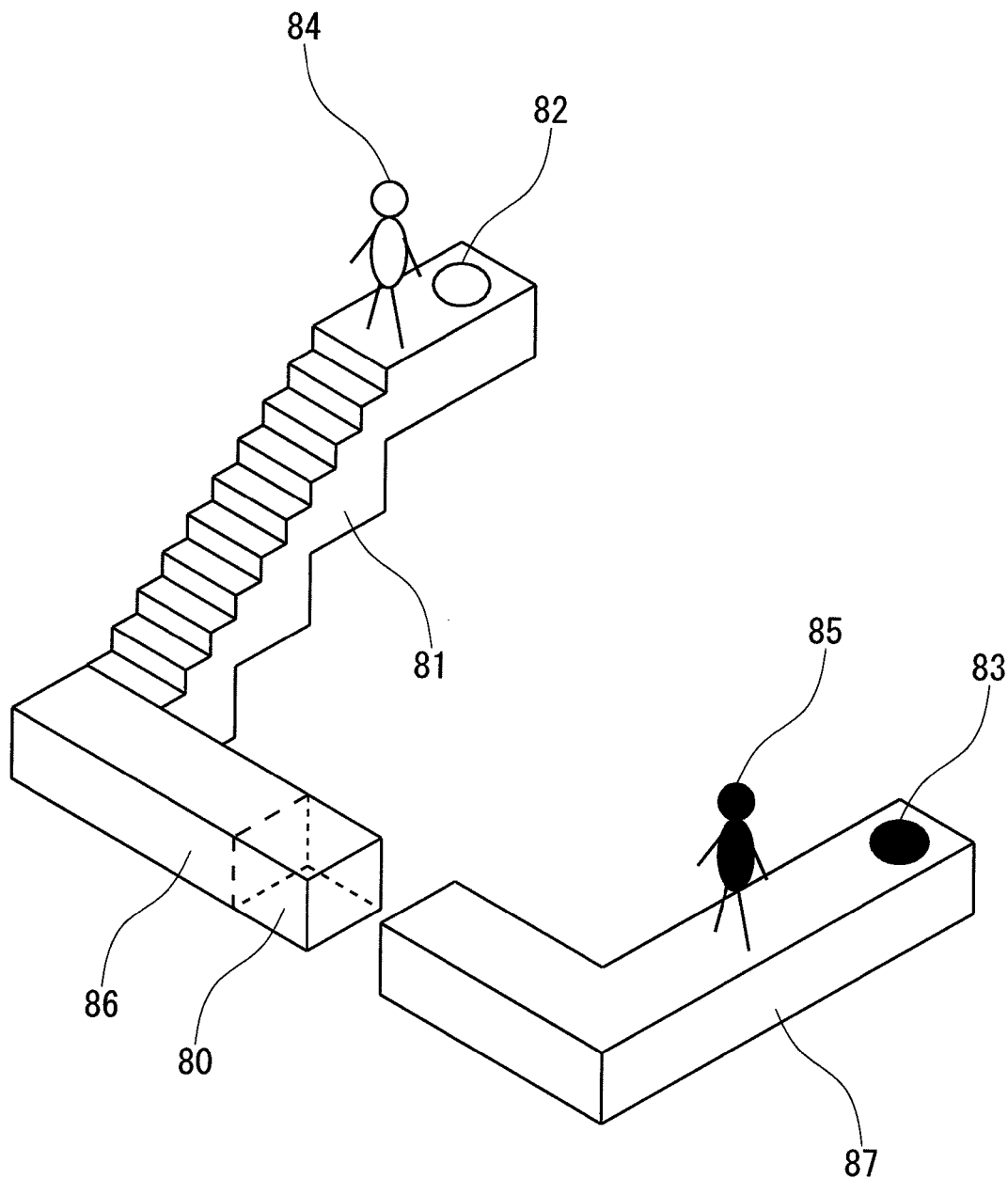
FIG. 1 shows an example of a three-dimensional space in a game that is controlled by a game device according to an embodiment.

FIG. 1 shows an example of a three-dimensional space in a game that is controlled by a game device according to this embodiment. Provided in the three-dimensional space are a block 80, which is cubic, and a plurality of passages 86 and 87, which are formed in combination with a staircase 81 connecting two blocks disposed at different height positions. Disposed on the passages are a cast 84, which is a character that moves automatically along the upper base of the passage, and an echo 85, which is a stationary character, and a player moves the cast 84 such that the cast 84 may make contact with the echo 85. Further assigned to the surface of the passage are functions that allow the cast 84 to move in directions away from the upper base of the passage. To be more precise, a fan 82, which has a function of having the cast 84 jump, and a hole 83, which has a function of having the cast 84 drop, are provided. It is to be noted that the block 80 may be a parallelepiped having sides respectively parallel with the three axes of coordinate set in the three-dimensional space or a rectangular parallelepiped in a rectangular coordinate system, but it is a cube in the present embodiment for ease of understanding.

Since the passage 86 on which the cast 84 is disposed and the passage 87 on which the echo 85 is disposed are spaced apart from each other in the three-dimensional space, the cast 84 will never make contact with the echo 85 as long as the cast 84 is moving along the passage 86. According to the present embodiment, however, the use of the following five new rules makes it possible for the cast 84 to move between the passages which are spatially apart from each other.

1. Subjective Move

Figure 2A:
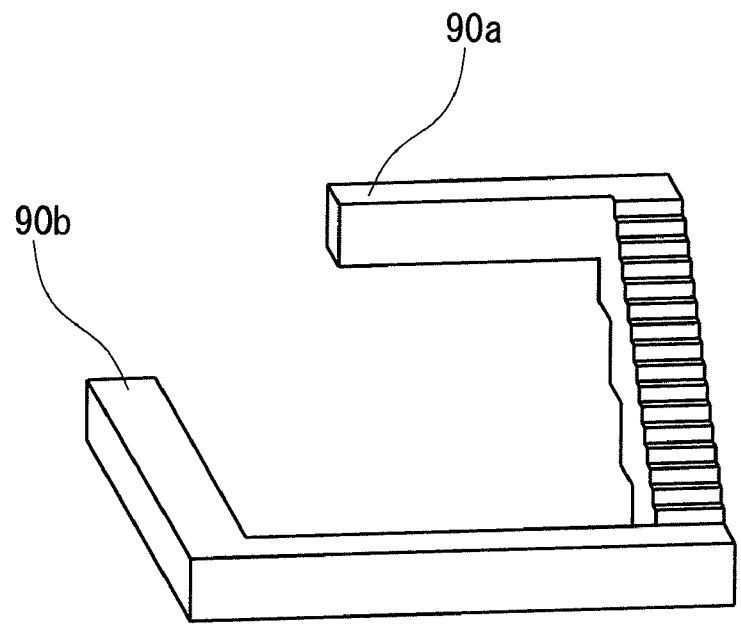
FIGS. 2A and 2B are illustrations for explaining a first rule employed by the present embodiment.
Figure 2B:
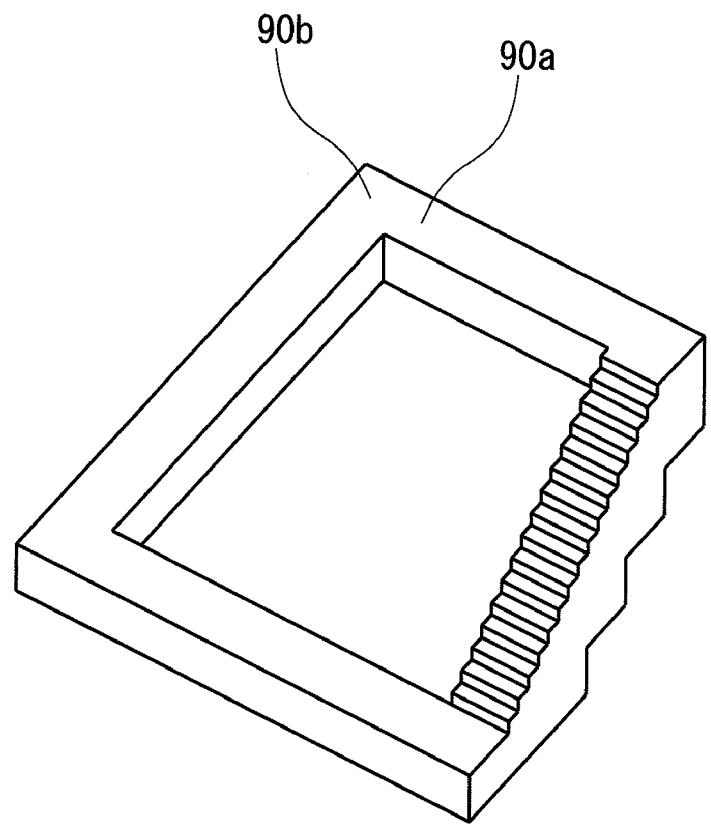

FIGS. 2A and 2B are illustrations for explaining a first rule employed by the present embodiment. In FIG. 2A, a block 90a and a block 90b are disposed at different height positions. However, with the point of view shifted as shown in FIG. 2B, they may look as if they are connected to each other. In the present embodiment, therefore, it is assumed that the blocks which look as if they are connected to each other are blocks which are actually connected to each other, so that the cast 84 can move from the block 90a to the block 90b. This rule is called "subjective move".

2. Subjective Landing

Figure 3A:
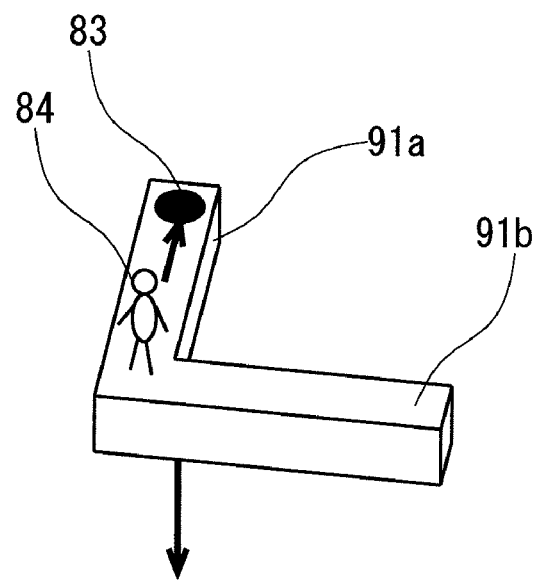
FIGS. 3A and 3B are illustrations for explaining a second rule employed by the present embodiment.
Figure 3B:
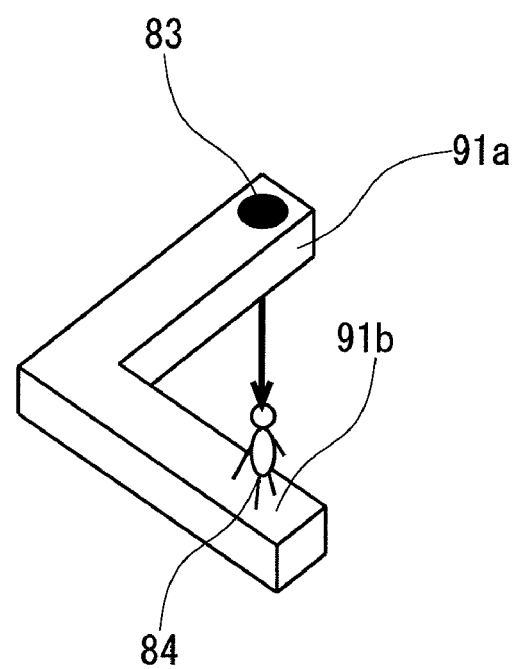

FIGS. 3A and 3B are illustrations for explaining the second rule employed by the present embodiment. In FIG. 3A, a block 91a provided with a hole 83 and a block 91b are disposed at the same height. However, with the point of view shifted as shown in FIG. 3B, the block 91b may look as if it is located directly below the block 91a. In the present embodiment, therefore, when the cast 84 falls through the hole 83, the cast 84 is enabled to actually land on the block 91b which looks as if it is below its feet. This rule is called "subjective landing".

3. Subjective Presence

Figure 4A:
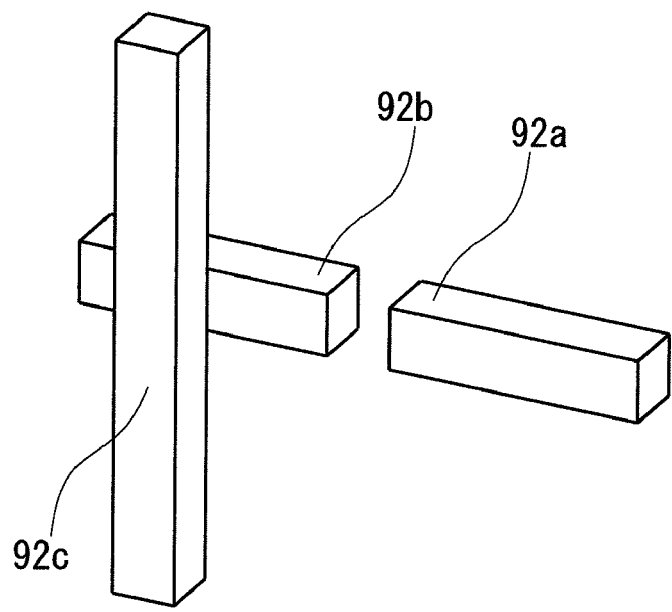
FIGS. 4A and 4B are illustrations for explaining a third rule employed by the present embodiment.
Figure 4B:
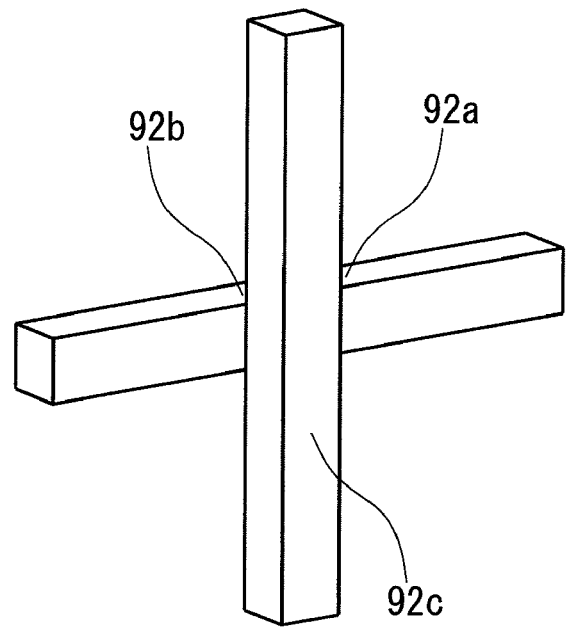

FIGS. 4A and 4B are illustrations for explaining a third rule employed by the present embodiment. In FIG. 4A, a block 92a and a block 92b are disposed at spatially apart positions. However, with the point of view shifted as shown in FIG. 4B, they may look as if they are connected to each other with the gap therebetween hidden behind an object 92c. In the present embodiment, therefore, it is assumed that there is a block in the position hidden behind the other object, so that the cast 84 can move from the block 92a to the block 92b. This rule is called "subjective presence".

4. Subjective Absence

Figure 5A:
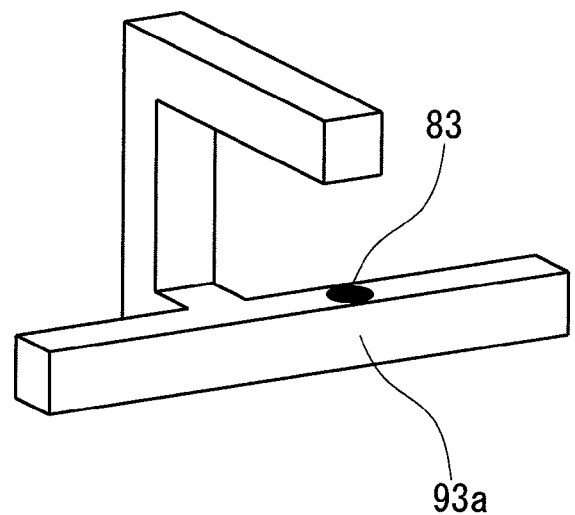
FIGS. 5A and 5B are illustrations for explaining a fourth rule employed by the present embodiment.
Figure 5B:
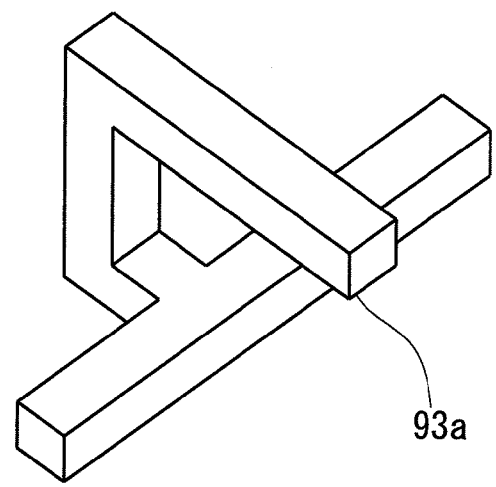

FIGS. 5A and 5B are illustrations for explaining a fourth rule employed by the present embodiment. In FIG. 5A, a block 93a is provided with a hole 83. However, with the point of view shifted as shown in FIG. 5B, it may look as if the hole 83 is not present because the hole 83 provided in the block 93a is hidden behind another passage. In the present embodiment, therefore, it is assumed that the fan 82 or the hole 83 hidden behind another object is not actually present, so that the fan 82 or the hole 83 does not perform its function. This rule is called "subjective absence".

5. Subjective Jump

Figure 6A:
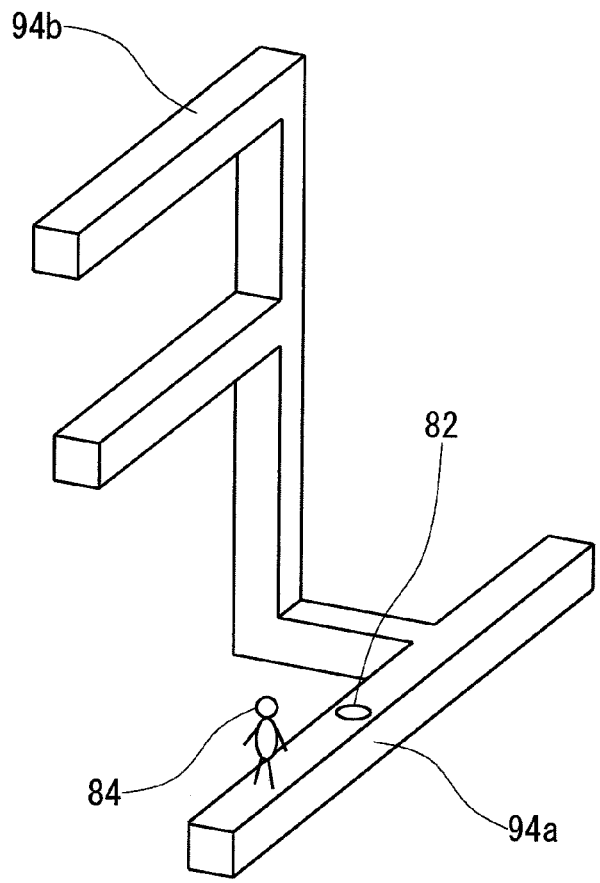
FIGS. 6A and 6B are illustrations for explaining a fifth rule employed by the present embodiment.
Figure 6B:
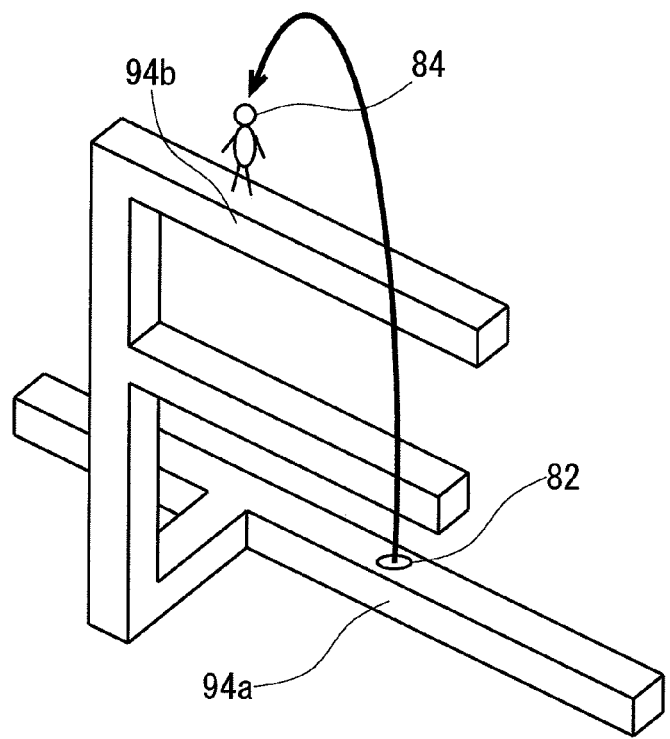

FIGS. 6A and 6B are illustrations for explaining a fifth rule employed by the present embodiment. In FIG. 6A, a block 94a provided with a fan 82 and a block 94b are disposed at spatially wide apart positions. However, with the point of view shifted as shown in FIG. 6B, it may look as if the distance between the block 94a and the block 94b has shrunk. In the present embodiment, therefore, when the cast 84 jumps using the fan 82, the cast 84 is enabled to actually land on the block 94b which looks as if it is present near the fan 82. This rule is called "subjective jump".

Using the above-described five rules, the player can move the cast 84 even between passages that are actually spaced apart in the three-dimensional space, by manipulating the point of views.

Figure 7:
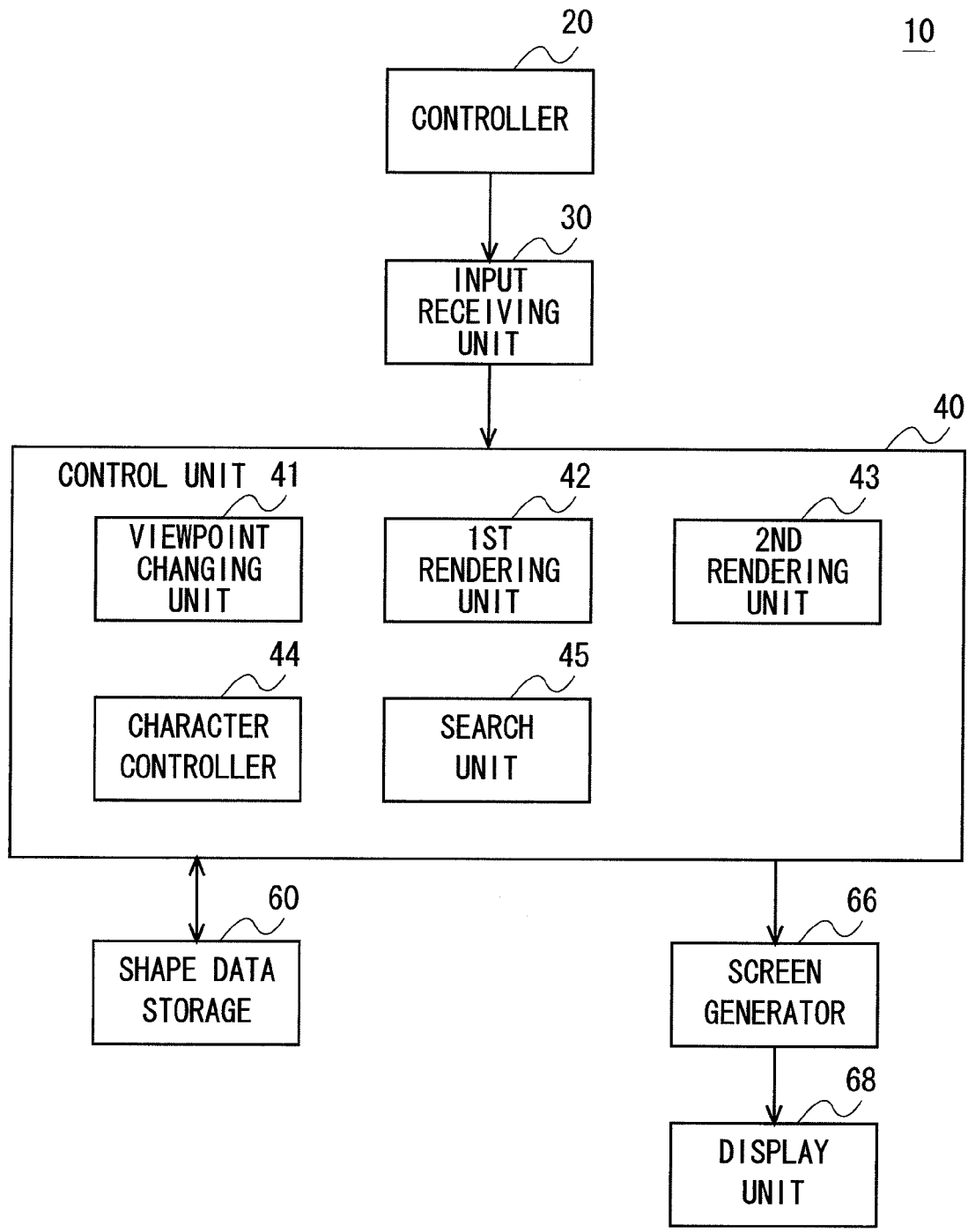
FIG. 7 shows a structure of a game device according to an embodiment.

FIG. 7 shows a structure of the game device 10 according to an embodiment. The game apparatus 10 includes a controller 20, an input receiving unit 30, a control unit 40, a shape data storage 60, a screen generator 66, and a display unit 68. These structural components may be achieved hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

The input receiving unit 30 receives control signals inputted from the controller 20 which is operated by the player. The control unit 40 manages the progress of a game, in which a "cast" is moved along sterical passages disposed in the three-dimensional space, by controlling the point of view based on an operation input from the player as received by the input receiving unit 30. The shape data storage 60 stores data for objects disposed in the three-dimensional space. The screen generator 66 generates screens of the game controlled by the control unit 40 and has them displayed by the display unit 68.

Figure 8:
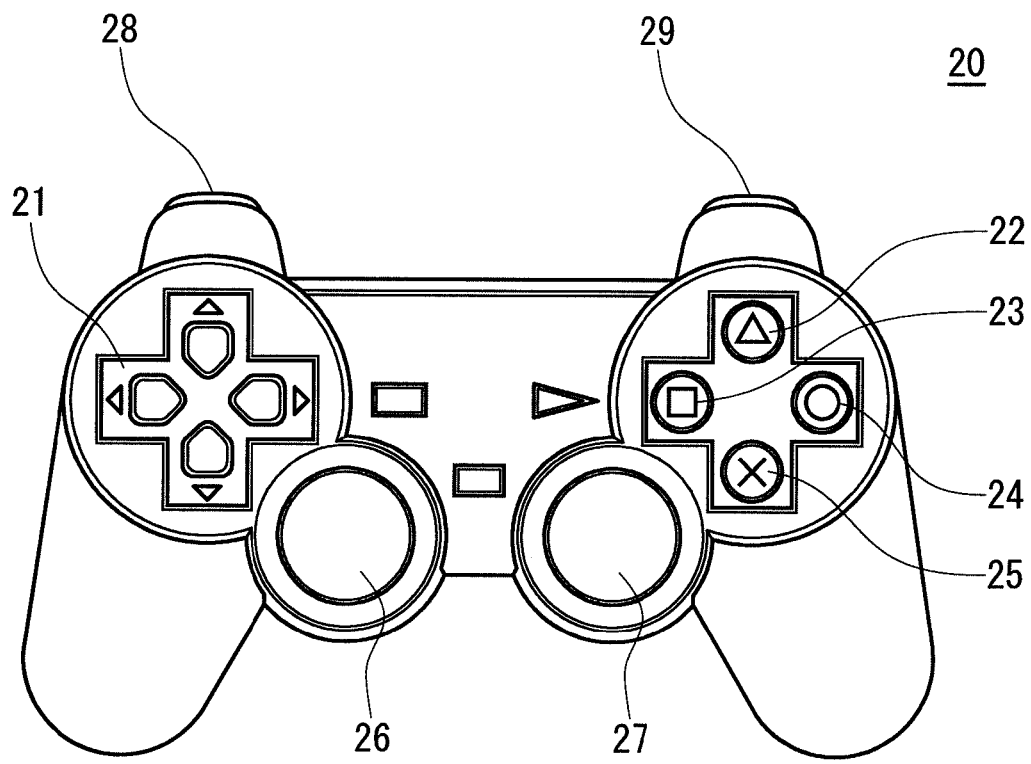
FIG. 8 shows an appearance of a controller.

FIG. 8 shows an appearance of a controller 20. Provided on the upper face of the controller 20 are an arrow key 21, a "Δ" (triangle) button 22, a "☐" (square) button 23, a "○" (circle) button 24, a "x" (cross) button 25, and analog sticks 26 and 27. Also provided on a side face of the controller 20 are an L button 28 and an R button 29. In the present embodiment, a function of shifting the viewpoint in an inputted direction is assigned to the arrow key 21 and the analog sticks 26 and 27, and a function of making viewpoint shift faster is assigned to the R button, respectively. Also, a function of stopping the cast 84 is assigned to the triangle button 22, and a function of making the move of the cast 84 faster is assigned to the cross button 25, respectively. Further, as will be described later, a function of requesting a search for a block that enables a subjective move is assigned to the square button 23, and a function of changing the object of search is assigned to the circle button 24, respectively.

Figure 9:
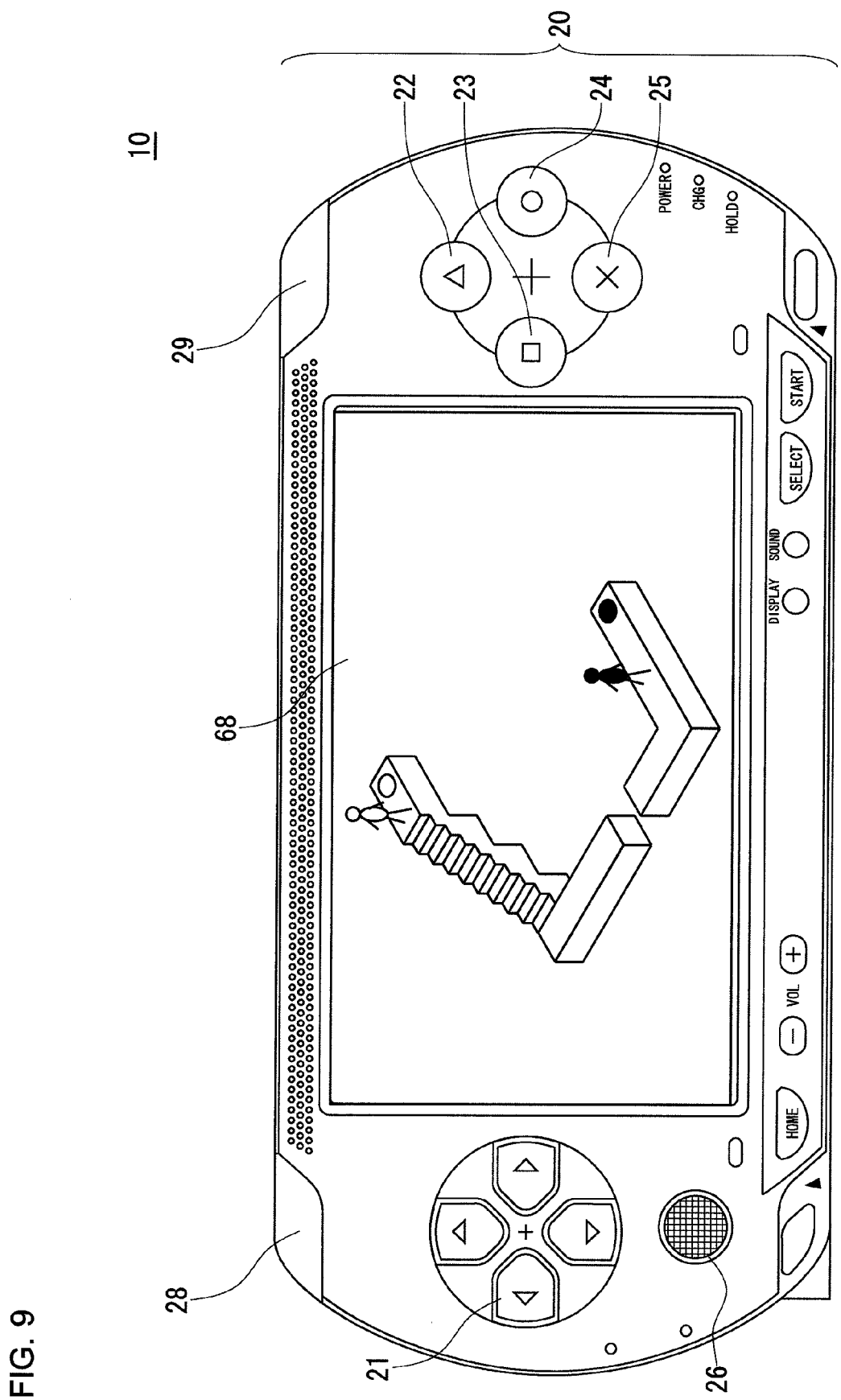
FIG. 9 shows another example of a controller.

FIG. 9 shows another example of a controller 20. FIG. 9 shows an appearance of a portable game apparatus 10, and a controller 20 and a display unit 68 are provided on the upper face of the game apparatus 10. The members having the same functions as those of the controller 20 shown in FIG. 8 are given the same reference numerals.

The shape data storage 60 stores data for objects disposed in the three-dimensional space. The shape data storage 60 stores the three-dimensional world coordinates of the center positions of objects such as a block 80 and a staircase 81, the three-dimensional world coordinates of the present positions of characters such as a cast 84 and an echo 85, the identification information on blocks 80 provided with a fan 82 or a hole 83, and the like. Also, the shape data storage 60 stores three-dimensional shape data for the blocks 80, the staircase 81, the fan 82, the hole 83, the cast 84, the echo 85, and the like.

In the present embodiment, cubic blocks 80 having an identical shape are arranged in the three-dimensional space. This makes it easier for the player to grasp the sterical shapes of passages and also apply the above-described rules. Also, this reduces the burden of rendering. Also, since the blocks 80 are placed in set positions of a three-dimensional lattice, the positions of the blocks 80 may also be expressed by their coordinates in a coordinate system in which each side of the cube is a unit vector. This may not only reduce the amount of data but also reduce the processing load of search to be described later.

A viewpoint changing unit 41 receives an instruction to change the point of view or the line of sight, which is conveyed from the input receiving unit 30, and changes the point of view or the line of sight for rendering a three-dimensional space. The viewpoint changing unit 41 may shift the point of view along a sphere with its center at a predetermined position set within the three-dimensional space. At this time, the direction of the predetermined position from the point of view may be used as the line of sight. The viewpoint changing unit 41 conveys the changed point of view to the first rendering unit 42 and the second rendering unit 43.

Figure 10:
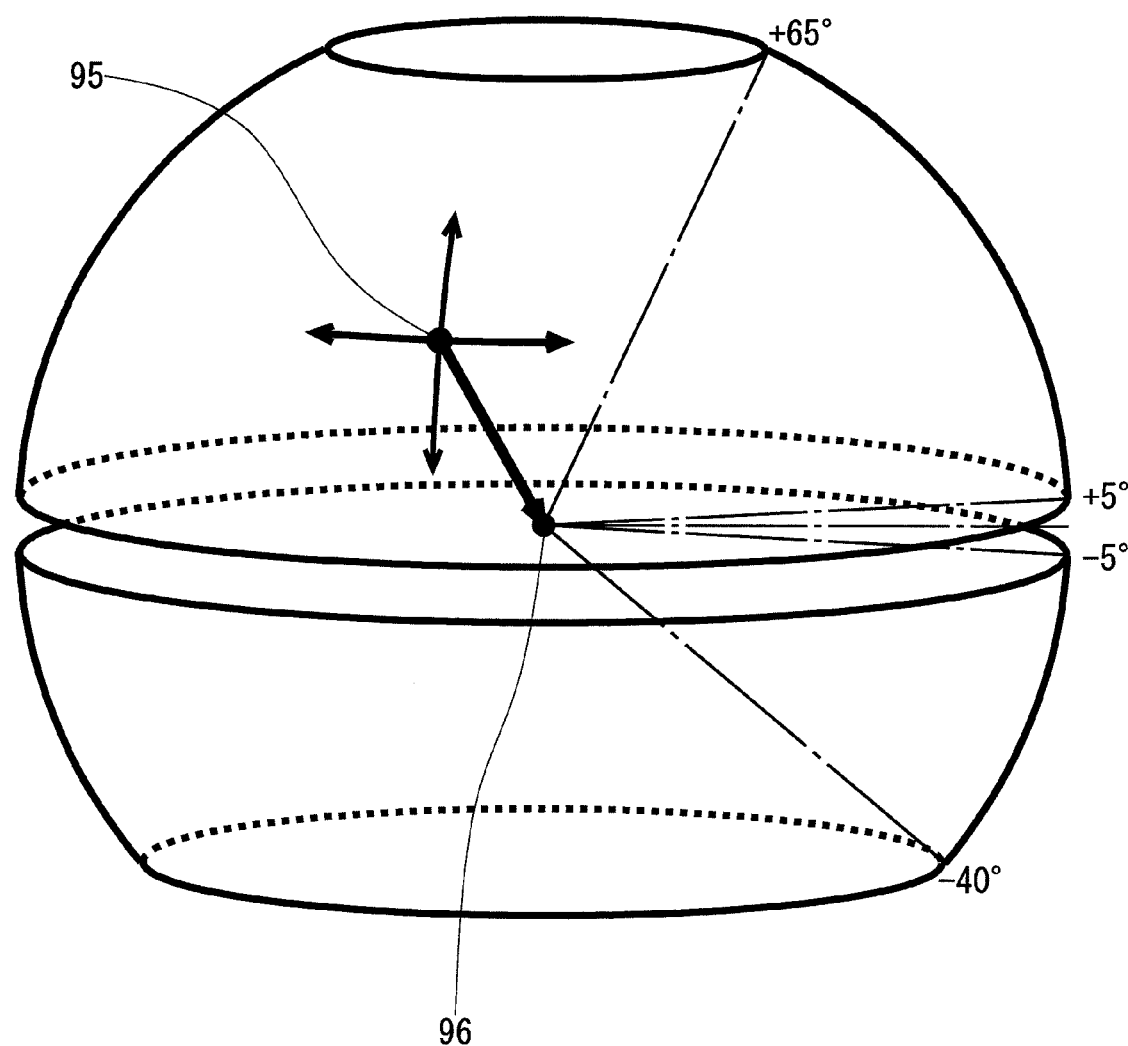
FIG. 10 is an illustration for explaining an operation of a viewpoint changing unit.

FIG. 10 is an illustration for explaining an operation of a viewpoint changing unit 41. Upon receipt of a direction input from the arrow key 21 or the analog stick 26 of the controller 20, the viewpoint changing unit 41 shifts the point of view 95 in the inputted direction along the sphere with its center at a point 96. Now the direction of the center point 96 from the point of view 95 is the line of sight. The radius of the sphere may be expanded or contracted according to the whole size of objects disposed in the three-dimensional space, for example, in such a manner that the whole can fit into the screen. Note that in the present embodiment the viewpoint changing unit 41 changes the point of view, but, in another example, a three-dimensional space may be rotated by performing a rotational transform on the world coordinates of the objects.

The viewpoint changing unit 41 forbids the line of sight to be maintained in a state of being parallel or perpendicular to the upper base of a block 80 on which the cast 84 moves for a predetermined length of time or over. The reason for restricting the point of view like this will be explained below.

Figure 11A:
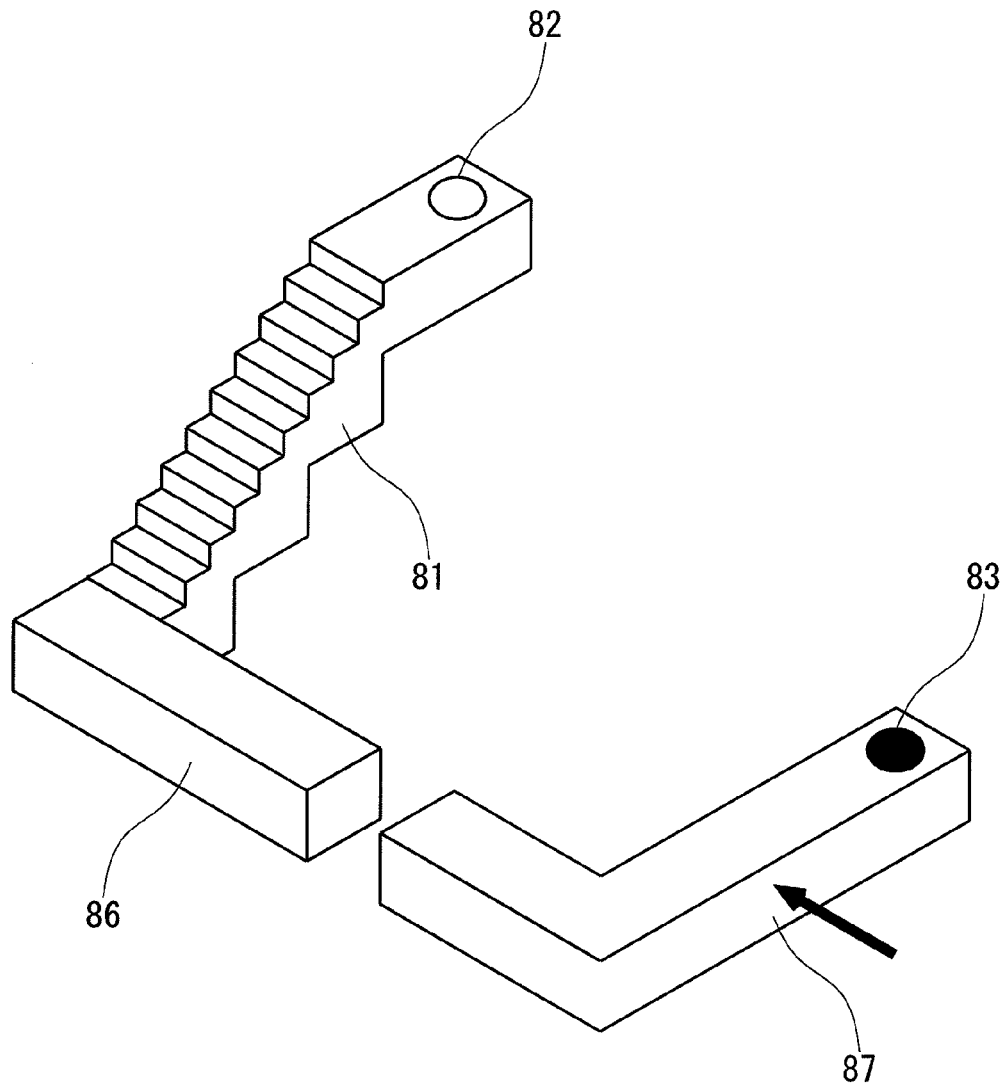
FIGS. 11A and 11B are illustrations for explaining a reason for forbidding the shift of a point of view to right beside.
Figure 11B:
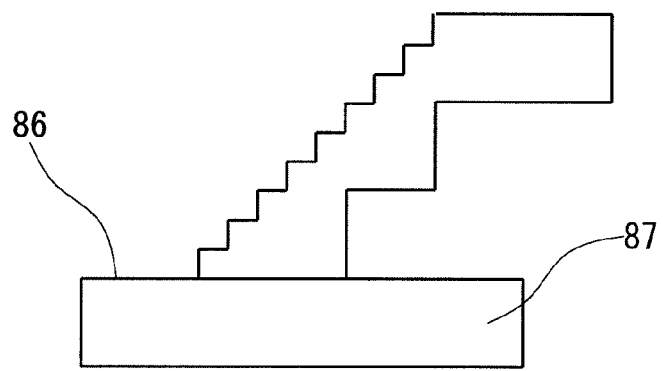

FIGS. 11A and 11B are illustrations for explaining a reason for forbidding the shift of the point of view to right beside. When the three-dimensional space shown in FIG. 11A is seen in the arrow direction, that is, from right beside, a character may be able to go back and forth between a passage 86 and a passage 87 easily by subjective move because the upper face of the passage 86 and the upper face of the passage 87 are aligned with each other as shown in FIG. 11B. Furthermore, since all of fans 82 and holes 83 provided in the upper faces of passages are not visible, all the fans 82 and holes 83 will not perform their functions because of their subjective absence. Thus, allowing the shift of the point of view in horizontal directions may sometimes make the game overly easy to play.

Figure 12A:
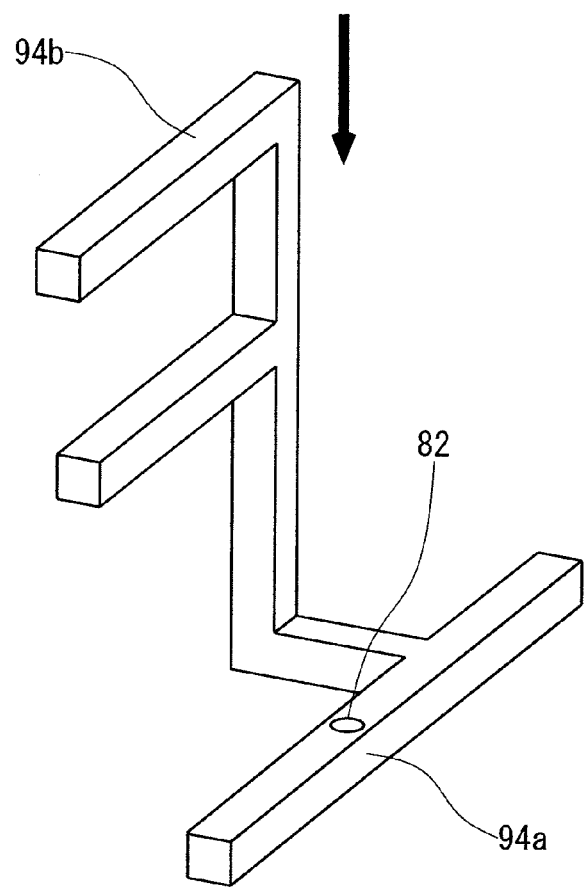
FIGS. 12A and 12B are illustrations for explaining a reason for forbidding the shift of a point of view to right above.
Figure 12B:
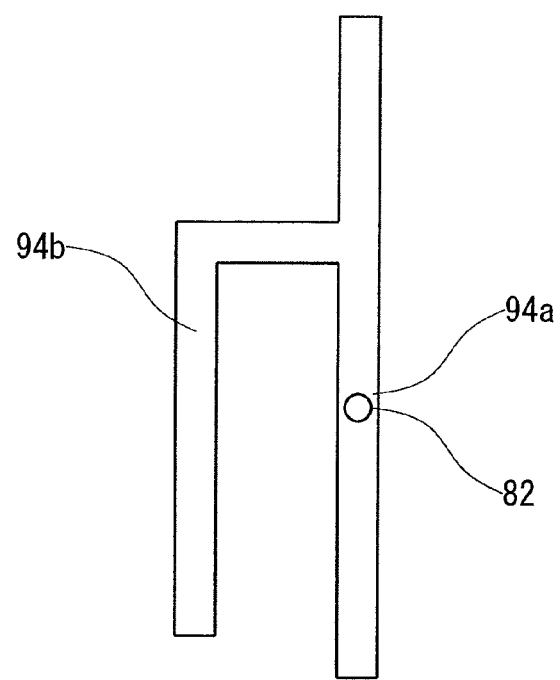

FIGS. 12A and 12B are illustrations for explaining a reason for forbidding the shift of the point of view to right above. When the three-dimensional space shown in FIG. 12A is seen in the arrow direction, that is, from right above, a character may be able to go back and forth between a block 94*a* and a block 94*b* easily by subjective move because a passage including the block 94*a*, which is actually disposed at a different height position, and a passage including the block 94*b* look as if they are interconnected. Thus, allowing the shift of the point of view to right above or right below may sometimes make the game overly easy to play.

As described above, a game according to the present embodiment employs a rule of subjective move by which a character can move to and fro between passages that look as if they are interconnected. Thus, a new problem presents itself that the game may have an extremely altered level of difficulty if the shift of the point of view in specific directions, such as right above, right below, and right beside, is permitted. Hence, the viewpoint changing unit 41 restricts the change of viewpoint within a range of horizontal to 65° in the upward direction and within a range of horizontal to 40° in the downward direction as shown in FIG. 10. That is, the viewpoint changing unit 41 ignores any instruction inputs for a change of viewpoint otherwise and thus does not allow a change of the point of view beyond the aforementioned ranges. Also, when the point of view enters in the range of horizontal to 5° above or below the horizontal including the directly lateral direction, the viewpoint changing unit 41 forcibly shift the point of view to outside the range.

Figure 13:
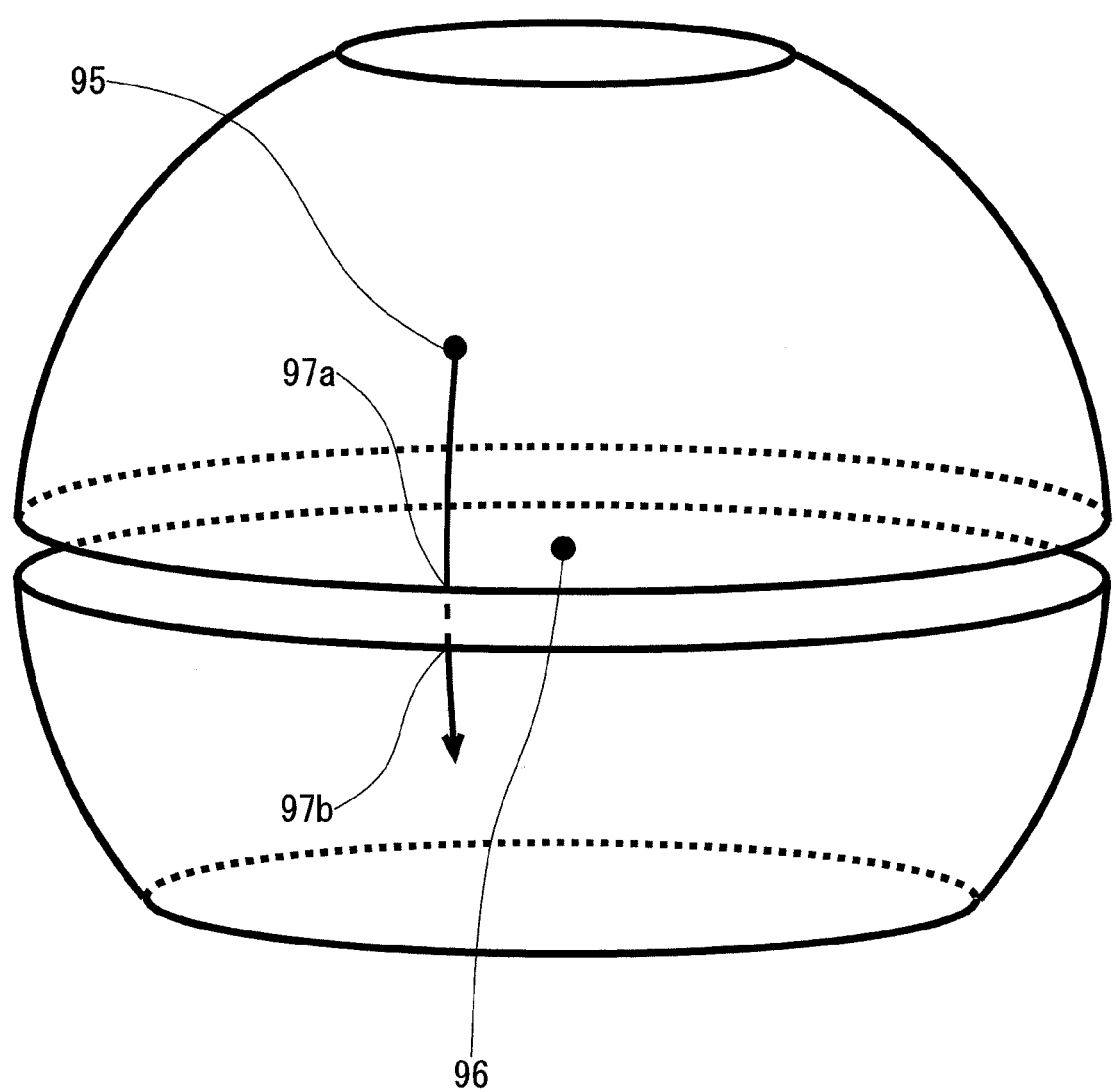
FIG. 13 is an illustration for explaining an operation of a viewpoint changing unit when a point of view is shifted in a downward direction.

FIG. 13 is an illustration for explaining an operation of a viewpoint changing unit 41 when the point of view is shifted in a downward direction. When the player shifts the point of view in a downward direction from a position 95, the viewpoint changing unit 41 shifts the point of view continuously in the downward direction down to a position 97*a*, which is a position 5° above the horizontal. If an operation input to shift the point of view further downward is received at the position 97*a*, the viewpoint changing unit 41 forcibly shifts the point of view to a position 97*b*, which is a position 5° below the horizontal, thereby forbidding a stoppage of the point of view between the position 97*a* and the position 97*b*. The viewpoint changing unit 41 may have the point of view jump discontinuously or slide continuously from the position 97*a* to the position 97*b*. Either way, the point of view is controlled in such a manner that it does not stop at a position in a horizontal direction, that is, a right beside position.

In the latter case, the viewpoint changing unit 41, when it receives an instruction input from the player to change the point of view in a direction other than downward while it is changing the point of view continuously from the position 97*a* to the position 97*b*, may shift the point of view away from the range between 5° above and 5° below the horizontal, at the same time shifting it in a newly input direction. For example, the viewpoint changing unit 41, when it receives an instruction input to change the point of view upward while it is changing the point of view from the position 97*a* to the position 97*b*, switches the direction of shift from the current position to upward direction and changes the point of view continuously up until it reaches the position 97a. Also, the viewpoint changing unit 41, when it receives an instruction input to change the point of view in a rightward direction, switches the direction of shift from the current position to a right bottom direction and shifts the point of view to a position 5° below the horizontal. The point is that control is performed such that the point of view does not remain in the range between 5° above and 5° below the horizontal for a predetermined length of time or over.

Figure 14:
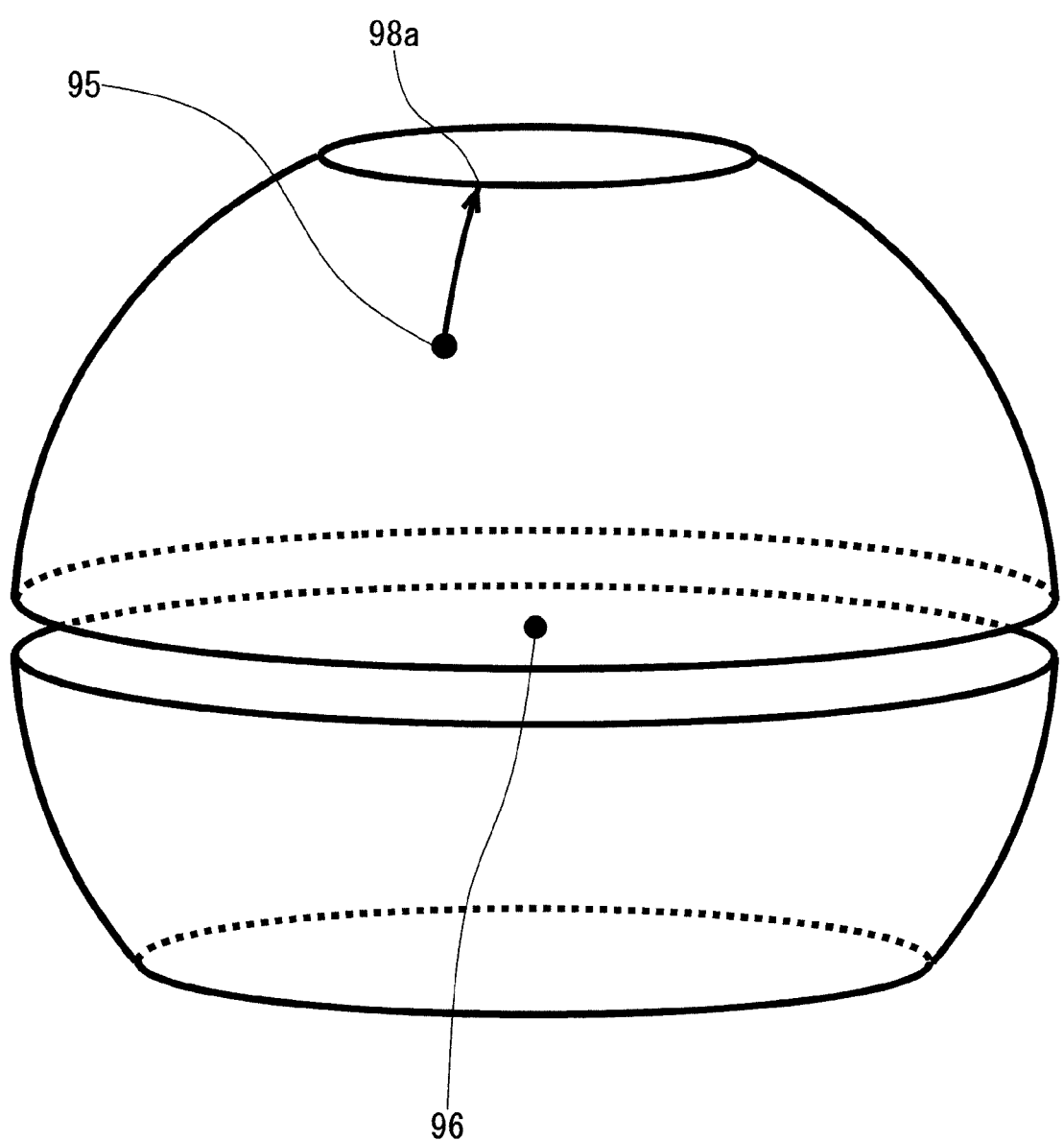
FIG. 14 is an illustration for explaining an operation of a viewpoint changing unit when a point of view is shifted in an upward direction.

FIG. 14 is an illustration for explaining the operation of a viewpoint changing unit 41 when the point of view is shifted in an upward direction. When the player shifts the point of view in an upward direction from a position 95, the viewpoint changing unit 41 shifts the point of view continuously in the upward direction up to a position 98a, which is a position 65° above the horizontal. If an operation input to shift the point of view further upward is received at the position 98a, the viewpoint changing unit 41 ignores it and forbids the shift of the point of view to right above.

Figure 15:
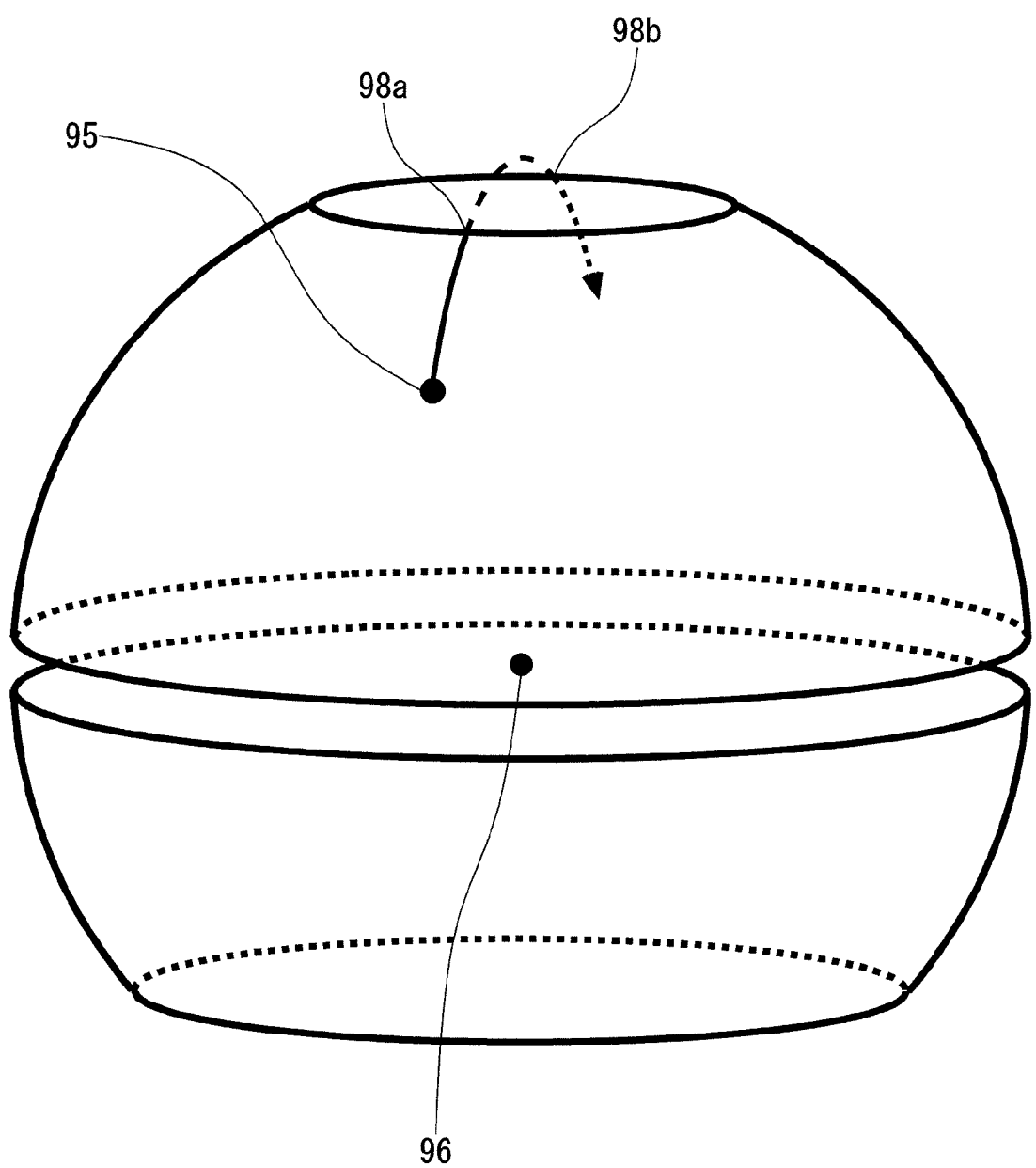
FIG. 15 is an illustration for explaining another example of an operation of a viewpoint changing unit when a point of view is shifted in an upward direction.

FIG. 15 is an illustration for explaining another example of an operation of a viewpoint changing unit 41 when the point of view is shifted in an upward direction. If an operation input to shift the point of view further upward is received at the position 98a, the viewpoint changing unit 41 forcibly shifts the point of view to a position 98b, which is a position on the opposite side, thereby forbidding a stoppage of the point of view between the position 98a and the position 98b. In this case, simply shifting the point of view to the opposite side may reverse the vertical direction of the screen, resulting in a state where the direction of operation input and the shift direction of the point of view are opposite to each other. In such a case, therefore, the vertical direction of the screen may be inverted.

The first rendering unit 42 acquires a point of view from the viewpoint changing unit 41 and renders an object disposed in the three-dimensional space through parallel projection transformation by referencing data stored in the shape data storage 60. The first rendering unit 42 may perform the rendering by setting the direction from the conveyed point of view toward a predetermined position set in the three-dimensional space as the line of sight. That is, the first rendering unit 42 projects the three-dimensional space using a plane, in which a vector from the point of view toward a predetermined position is a normal vector, as the plane of projection.

Similarly to the first rendering unit 42, the second rendering unit 43 acquires a point of view from the viewpoint changing unit 41 and renders a block 80 and a staircase 81 by referencing data stored in the shape data storage 60. The second rendering unit 43 does not generate a display screen by calculating the respective pixel values of pixels but stores the respective block IDs, plane IDs, and Z values in pixels. The second rendering unit 43 may further store information indicating the presence or absence of the fan 82 or the hole 83 in each pixel. The results of this rendering, as will be described later, are used by the character controller 44. Also, it may be so arranged that a part or the whole of the functions of the second rendering unit 43 is shared by the first rendering unit 42.

The character controller 44 has a character, such as a cast 84, move along the upper base of a passage formed by blocks 80 disposed in the three-dimensional space. The character controller 44 moves the cast 84 at a predetermined speed, calculates the three-dimensional world coordinates of the present position of the cast in time with the time intervals of rendering performed by the first rendering unit 42, and thereby updates the data in the shape data storage 60. The character controller 44 moves the cast 84 at a speed faster than normal when the cross button 25 is being depressed by the player. The character controller 44 stops the move of the cast 84 at a press on the triangle button 22 by the player, and restarts the move of the cast 84 at a press again on the triangle button 22 by the player.

The character controller 44 determines a block to which the cast 84 is to be moved next before the cast 84 moves past the middle of the block 80. The character controller 44 determines the block for the next move by ascertaining the presence or absence of an adjacent block or staircase directly in front or back or directly on the right or left side of the block which is below the feet of the cast 84 in the following manner.

Firstly, the character controller 44 determines whether there is an adjacent block on the left side of the direction of travel with reference to the block which is below the feet of the cast 84. If there is actually an adjacent block on the left side in the three-dimensional space, the character controller 44 will determine the block to be one to which the cast 84 is to be moved. Even when the adjacent block on the left side in the three-dimensional space is provided with a fan 82 or a hole 83, the character controller 44 does not allow the function thereof to manifest itself as long as it is not visible because it is hidden behind an object in the rendered two-dimensional plane (subjective absence).

If there is actually no block in the adjacent block position on the left side in the three-dimensional space and yet there is a block rendered within a first range from the position where a virtual block is supposed to be rendered in a two-dimensional plane when the virtual block is disposed in the aforementioned position, then the character controller 44 sets the block as one for the next move by assuming that the block actually exists in the adjacent block position on the left side in the three-dimensional space (subjective move). The character controller 44 acquires an ID of the block for the next move by referencing the results of rendering by the second rendering unit 43, further acquires the three-dimensional world coordinates of the block by referencing data in the shape data storage 60, and thereby calculates the three-dimensional world coordinates of the present position of the cast 84 after its move to the block.

When the position of the adjacent block at left in the three-dimensional space is not visible because it is hidden behind an object in the rendered two-dimensional plane, the character control unit 44 sets the block as one for the next move by assuming that the block exists even if it does not actually exist in said position (subjective presence). When the point of view is changed to a point where the absence of a block below the feet of the cast 84 can be seen while the cast 84 is passing by the rule of subjective presence over the block which does not actually exist, the character controller 44 causes the cast 84 to fall downward from the position. At this time, in the same way as when the cast 84 falls through a hole 83, the cast 84 is made to land on a block if there is such a block below the cast 84 in the two-dimensional plane.

If there is no adjacent block on the left of the direction of travel, the character controller 44 searches for a block for the next move in the order of front, right, and back. When the character controller 44 has determined that it cannot move the cast 84 to any of the adjacent blocks in front or back or at right or left, the character controller 44 has the cast 84 remain in the same position.

When the cast 84 has passed over a fan 82, the character controller 44 causes the cast 84 to jump at an initial speed set for the fan 82. It is to be noted, however, that the character controller 44 does not calculate the trajectory of the cast 84 in the three-dimensional space but calculates the trajectory of the cast 84 in the rendered two-dimensional space. The character controller 44 determines whether there is any block on the trajectory of the cast 84 jumping and then falling, by referencing data on the two-dimensional plane rendered by the second rendering unit 43, and has the cast 84 land on the block if there is one. At this time, the character controller 44 sets a Z value such that the falling cast 84 is the closest in the foreground of the screen, and has the cast 84 land on the block which is on the trajectory in the two-dimensional plane, without regard to the Z value of the block. The character controller 44 calculates the three-dimensional world coordinates of the present position of the cast 84 from the ID of the block on which the cast 84 has landed, by referencing data in the shape data storage unit 60, and updates the data in the shape data storage unit 60.

When the cast 84 has passed over a hole 83, the character controller 44 causes the cast 84 to fall down through the hole 83. And when the cast 84 is wholly visible after falling below the object which is in one piece with the block provided with the hole 83 in the three-dimensional space, the character controller 44 determines whether there is any block below the cast 84 in the two-dimensional plane, and has the cast 84 land on the block if there is one. The character controller 44 calculates the three-dimensional world coordinates of the present position of the cast 84 from the ID of the block on which the cast 84 has landed, by referencing data in the shape data storage unit 60, and updates the data in the shape data storage unit 60.

The search unit 45 searches for a set of blocks within a predetermined range of distance in a rendered two-dimensional plane and changes the point of view or the line of sight in such a manner that the located blocks may be rendered as if they are adjacent to each other in the two-dimensional plane. To be more precise, when a virtual block is disposed in a position adjacent to a block which is the object of search, the search unit 45 searches for the block within a second range where the distance to the virtual block in the two-dimensional plane is longer than that in the first range. If there is any block that is applicable, the search unit 45 changes the point of view or the line of sight so that the distance between the located block and the virtual block enters into the first range. The search unit 45 may make the search in arbitrary timing, after a change of the point of view, or at a request for a search by a press on the square button 23 by the player.

Figure 16A:
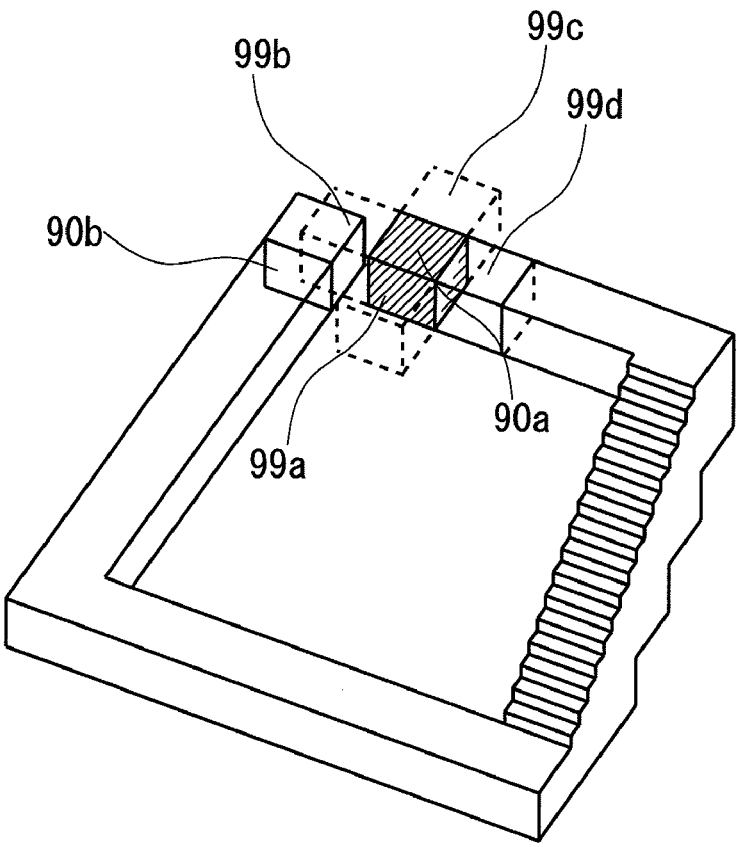
FIGS. 16A and 16B are illustrations for explaining an operation of a search unit.
Figure 16B:
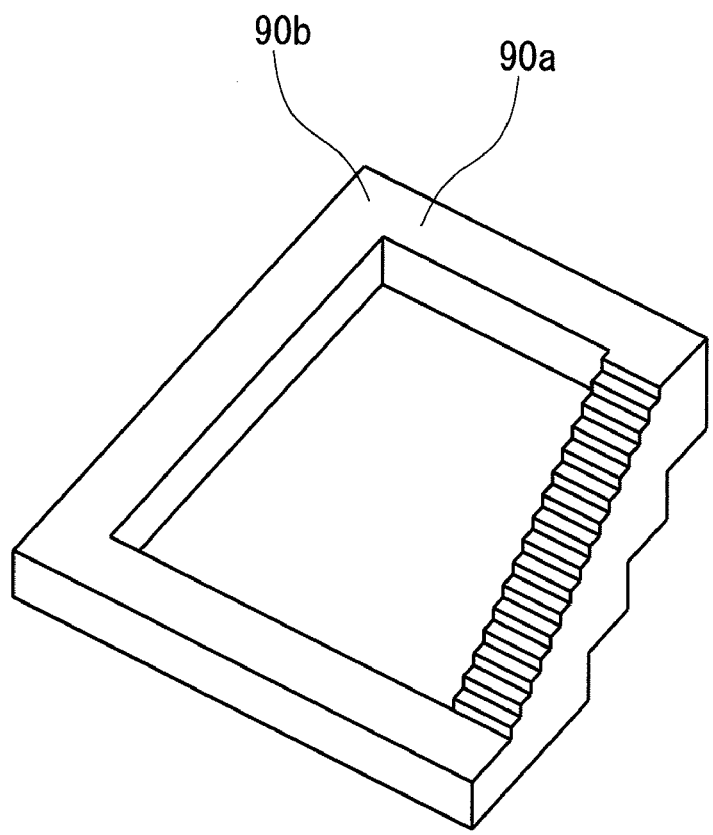

FIGS. 16A and 16B are illustrations for explaining the operation of the search unit 45. In FIG. 16A, upon receipt of an instruction input requesting a search, the search unit 45 first selects a block 90a where the cast 84 exists at this point of time as the object of search. The search unit 45 disposes a virtual block 99a virtually on the left of the direction of travel of the cast 84 with reference to the block 90a, and determines whether there is a block rendered in a second range with respect to a virtual block 99a in the two-dimensional plane generated by the second rendering unit 43. In the example of FIG. 16A, there is no block in the neighborhood of the virtual block 99a, and therefore the search unit 45 then disposes the virtual block 99a virtually in front in the direction of travel of the cast 84 with reference to the block 90a, and determines whether there is any block rendered in the second range from a virtual block 99b in the two-dimensional plane. In the example of FIG. 16A, the block 90b is rendered in the neighborhood of the virtual block 99b, so that the search unit 45 acquires the block 90b as the result of search. In this manner, the search unit 45 disposes virtual blocks 99a to 99d virtually in positions adjacent in front and back and at right and left of a block which is the object of search, and searches for a block rendered in the second range from the virtual blocks 99a to 99d in the two-dimensional plane. At this time, a block is actually disposed in the position of the virtual block 99d in the three-dimensional space, so that the virtual block 99d is excluded from the objects of search.

The located block 90b is spaced apart beyond the first range from the virtual block 99b in the two-dimensional plane, so that, as it is, a subjective move cannot be effected because the character control unit 44 does not determine the block 90a and the block 90b to be adjacent to each other. The search unit 45 changes the point of view in such a manner that the located block 90b may be rendered as if it is adjacent to the block 90a which is the object of search. To be more specific, using a vector connecting the centers of the block 90b and the virtual block 99b, a straight line in parallel with the vector is drawn from the point 96, which is the center of the sphere, such that the vector is in parallel with the line of sight, and the point of intersection of the straight line with the sphere is taken as the point of view. As a result, those blocks are rendered in the same position in the two-dimensional plane, so that, as shown in FIG. 16B, a subjective move is effected between the block 90a and the block 90b, which are rendered as if they are adjacent to each other.

If no block is discovered that allows a subjective move from the block 90a, the search unit 45 performs a search again by setting a block for the next move of the cast 84 as the object of search. In this manner, the search unit 45 may perform a search for blocks within a predetermined range from the present position of the cast 84, for example, up to five blocks ahead to which the cast 84 is expected to move as the objects of search.

In order to effect a subjective move by changing the point of view, the player needs to make delicate adjustments to the point of view so that the blocks look as if they are adjacent to each other. Yet, the players inexperienced with the operation system may find it difficult to make such delicate adjustments. The present embodiment, however, provides improved user-friendliness for the players because the point of view is changed automatically so that the blocks look as if they are adjacent to each other. Also, the objects of search are limited within a range surrounding the cast, which prevents the player from getting confused due to an automatic change of the point of view to an unexpected position because a block far apart from the cast is accidentally rendered very close. Moreover, in the same way as when the character controller 44 determines the block to which the cast 84 is to be moved, the search unit 45 searches for a block that permits a subjective move in the order of left, front, right, and back relative to the direction of travel, with reference to the block where the cast 84 exists. Accordingly, a preferential search is made for the block to which the player intends to move the cast 84, and thus the point of view can be shifted in such a manner as to effect a subjective move. This results in improved user-friendliness of the game to the player.

Second Embodiment

Figure 17:
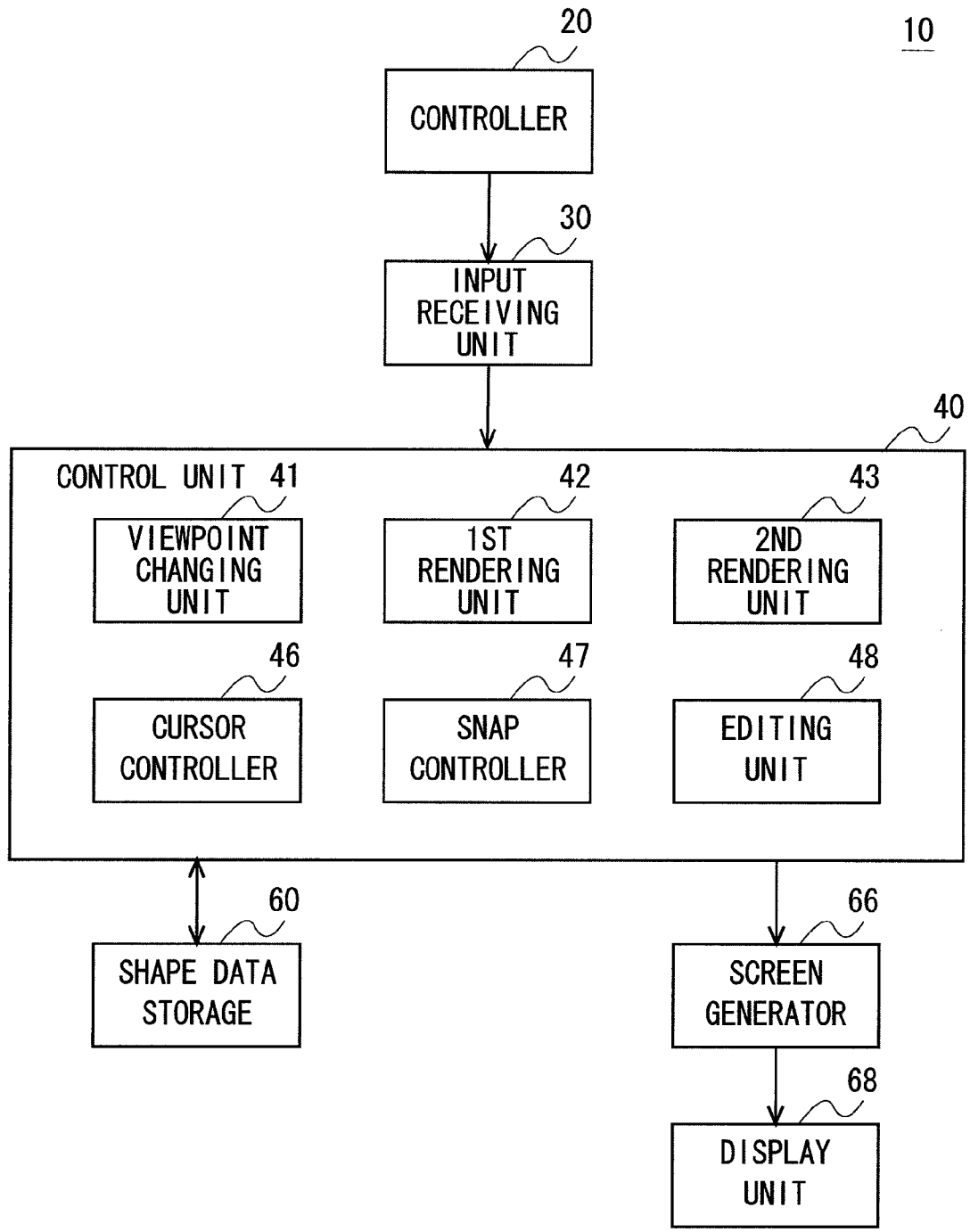
FIG. 17 shows a structure of a game device according to a second embodiment.

A description is now given of a technology with which to construct a three-dimensional space used in the aforementioned game apparatus. FIG. 17 shows a structure of a game device 10 according to a second embodiment. As compared with the structure of the game device 10, shown in FIG. 7, according to the second embodiment, the game device 10 according to the present embodiment is such that the control unit 40 includes a cursor controller 46, a snap controller 47, and an editing unit in place of the character controller 44 and the search unit 45. Other structural components and their operations are the same as those of the first embodiment. Note that the game device 10 according to the first embodiment and the game device 10 according to the second embodiment may be realized by the use of the same game device or difference game devices.

The cursor controller 46 moves a cursor in a screen used to edit the three-dimensional space according to a user operation. When a user enters an instruction instructing the cursor to snap to the nearest object, in the screen used to edit the three-dimensional space, the snap controller 47 determines an objet nearest to the present position of the cursor and then moves the cursor to that position. The editing unit 48 arranges or deletes objects, such as a block and a staircase, according to a user operation in the screen used to edit the three-dimensional space.

Figure 18:
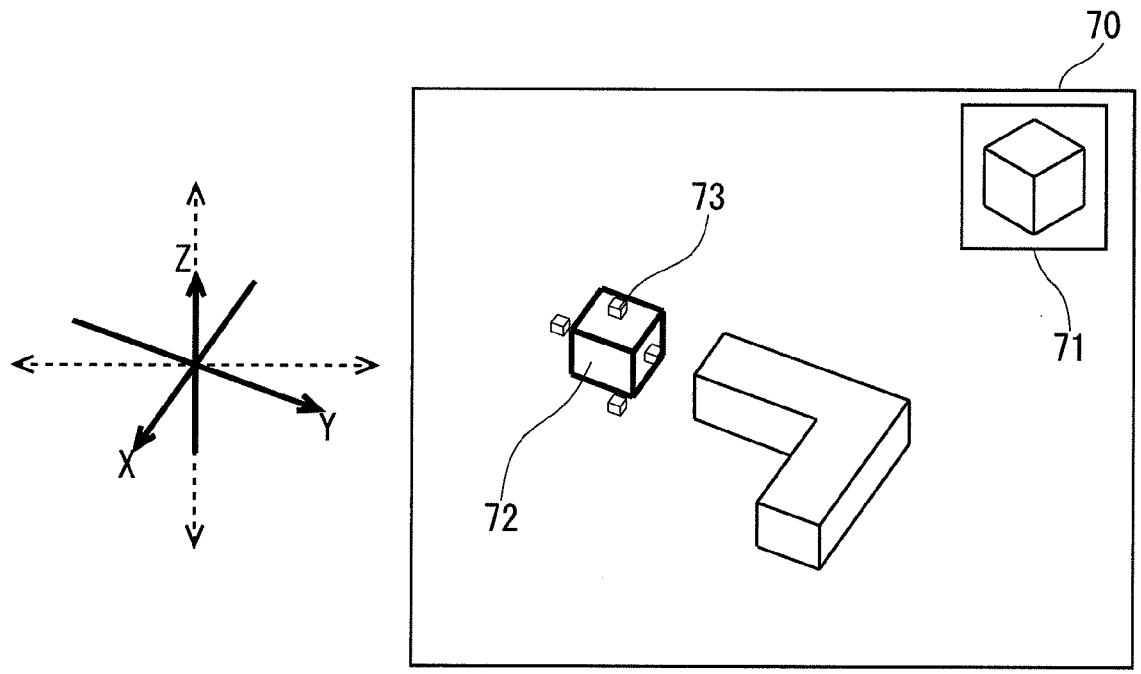
FIG. 18 shows an example of a screen with which to edit a three-dimensional space.

FIG. 18 shows an example of a screen with which to edit the three-dimensional space. A selection screen 71 to select an object disposed in the three-dimensional space and a cursor 72 to select the position of the object disposed therein are displayed on an editing screen 70. On the editing screen 70, a function of shifting the viewpoint in an inputted direction is assigned to the analog sticks 26 and 27, and a function of shifting the cursor 72 in an inputted direction is assigned to the arrow key 21, respectively. A function of making viewpoint shift faster is assigned to the R button, and a function of changing the direction of an object is assigned to the L button 28, respectively. A function of activating the selection screen 71 and changing an object disposed therein is assigned to the triangle button 22, a function of placing the selected object at the position of the cursor 72 is assigned to the cross button 25, and a function of deleting the object disposed already at the position of the cursor 72 is assigned to the cross button 25, respectively. Further, as will be described later, a function of moving the position of the cursor 72 to a position of an object, among the objects disposed already, nearest to the present position of the cursor 72 is assigned to the square button 23.

As the editing unit 48 receives an input from the circle button 24, the editing unit 48 acquires the coordinates of the present cursor 72 position from the cursor controller 46 and records the thus acquired coordinates and the type of the currently selected object in the shape data storage 60. As the editing unit 48 receives an input from the cross button 25, the editing unit 48 acquires the coordinates of the present cursor 72 position from the cursor controller 46 and search for the object already disposed in the thus acquired coordinates from the shape data storage 60. And if the object has already been disposed, the editing unit 48 unit will delete the data of said object from the shape data storage 60.

Similarly to the first embodiment, the viewpoint changing unit 41 receives inputs from the analog sticks 26 and 27 of the controller 20, and shifts the point of view in a specified direction. Similarly to the first embodiment, the first rendering unit 42 and the second rendering unit 43 each acquires a point of view from the viewpoint changing unit 41 and renders an object already disposed in the three-dimensional space through parallel projection transformation by referencing data stored in the shape data storage 60.

The cursor controller 46 moves the cursor 72 in a direction parallel with the three axes of coordinate set in the three-dimensional space parallel. In the present embodiment, the cursor 72 is a cube, namely a unit lattice, having unit-length sides respectively parallel with the orthogonal coordinate axes X, Y and Z and are moved in the three-dimensional space, per unit length, in six directions which are a front direction (the positive direction of Y axis) and a back direction (the negative direction of Y axis), a left direction (the positive direction of X axis), a right direction (the negative direction of X axis), an upward direction (the positive Z direction) and a downward direction (the negative direction of Z axis) along the orthogonal coordinate axes X, Y and Z. The cursor controller 46 assigns four directions of these six directions to four buttons (left button, right button, up button and down button) of the cross key 21 and moves the cursor 72 in the inputted directions.

More specifically, the cursor controller 46 assigns a function of moving the cursor in a direction having minimum angles formed with the four directions (up, down, left and right directions), among the positive and negative directions of X axis, the positive and negative directions of Y axes and the positive and negative axes of X axis, in the second-dimensional plane generated by the second rendering unit 43 to the buttons (left button, right button, up button and down button) of the cross key 21, respectively. For example, in the example of FIG. 18, the up button, the left button, the down button and the right button of the cross key 21 are assigned to the positive direction of Z axis, the negative direction of Y axis, the negative direction of Z axis, and the positive direction of Y axis, respectively. As a result, the input direction of the cross key 21 almost coincides with the direction in which the cursor 72 moves on the editing screen, and therefore an interface that is easy to follow intuitively can be provided.

The cursor controller 46 may determine a direction which is nearest to the four directions (up, down, left and right directions), respectively, in such a manner that angles formed by four unit vectors in the second-dimensional plane, namely (1, 0), (−1, 0), (0, 1) and (0, −1) are calculated by rendering six unit vectors, namely (1, 0, 0), (−1, 0, 0), (0, 1, 0), (0, −1, 0), (0, 0, 1) and (0, 0, −1) with the second-dimensional plane by the second rendering unit 43.

The cursor controller 46 displays an object indicated by the cursor 72 or in the vicinity of the cursor 72 in such a mode that the cursor moving direction can be identified. For example, in the example of FIG. 18, the movements enabled by the cross key 21 are assigned to the positive and negative directions of Z axis and the positive and negative directions of Y axis, so that FIG. 73 are displayed near the centers of faces orthogonal to the Y axis and Z axis in a cubic cursor 72. The cursor controller 46 may render four faces orthogonal to the directions to which the movements by the cross key 21 are assigned, among six faces of the cursor 72, using colors different from those used for the other faces. Also, arrows or the like indicating the directions to which the movements by the cross key 21 are assigned may be displayed. As a result, a user can visually and simply grasp the direction toward which the cursor moves by an operation input of the cross key 21.

Figure 19:
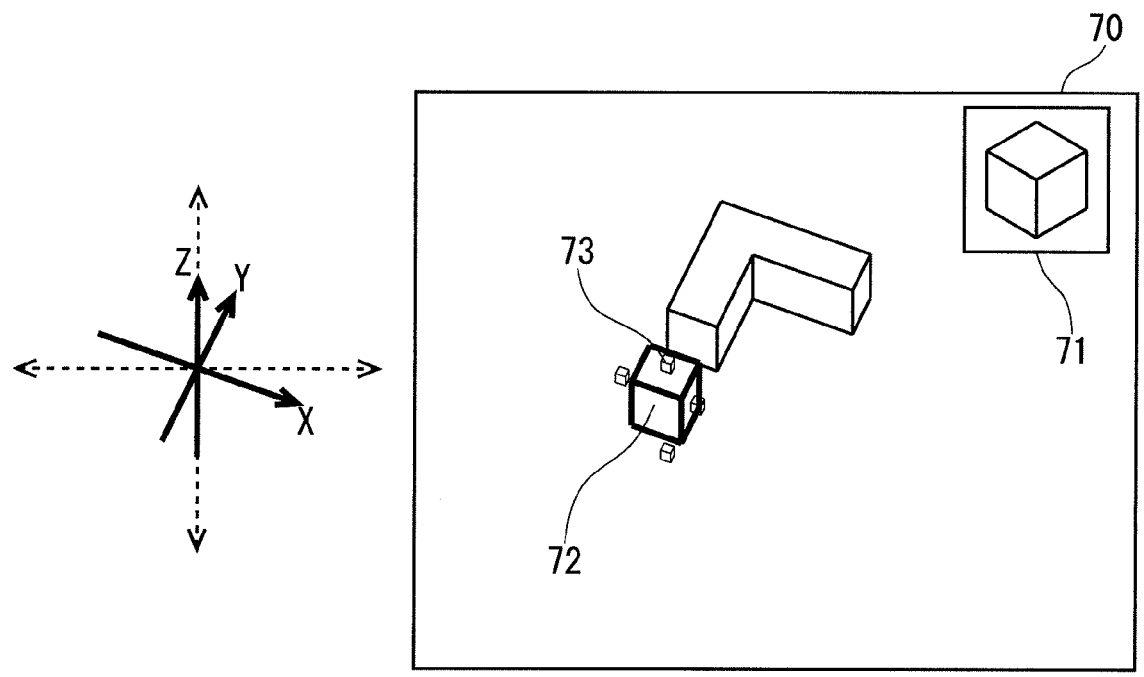
FIG. 19 shows an example of a screen with which to edit a three-dimensional space.

The user cannot move the cursor 72 in the direction parallel with the X axis, in the editing screen of FIG. 18. However, if the user changes the point of view using the analog stick 26 or 27, he/she can move the cursor 72 in the direction parallel with the X axis. For example, when the analog stick 26 is operated to effect the right direction and the point of view is moved counterclockwise about the Z axis in the editing screen of FIG. 18, an editing screen as shown in FIG. 19 results.

With the viewpoint changed, the cursor controller 46 reevaluates angles formed between the positive and negative directions of the three coordinate axes and the up and down directions on the editing screen, and changes the shift direction assigned to the cross key 21. In the editing screen of FIG. 19, the up button, the left button, the down button, and the right button of the cross key 21 are assigned to the positive direction of Z axis, the negative direction of X axis, the negative direction of Z axis, and the positive direction of X axis, respectively. In this manner, the cursor 72 can be moved to an arbitrary position while changing the point of view. When the point of view is changed, the cursor controller 46 may reevaluate the shift directions assigned to the cross key 21 or may reevaluate the shift directions assigned to the cross key 21 at predetermined timing (periodically at a predetermined time interval, for instance).

Figure 20A:
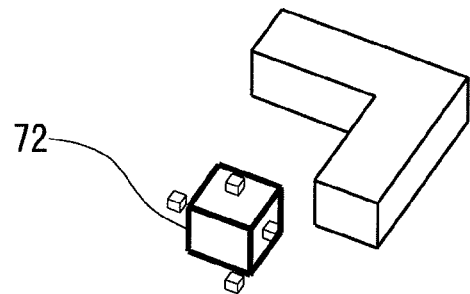
FIGS. 20A, 20B, 20C and 20D are illustrations for explaining an operation of a snap controller.

FIGS. 20A, 20B, 20C and 20D are illustrations for explaining an operation of the snap controller 47. Since, in the present embodiment, the first rendering unit 42 renders a three-dimensional space through parallel projection transformation, it is relatively difficult to determine the depth. For example, when the cursor 72 lies in a position away from the object already disposed as shown in FIG. 20A, there are cases where it is difficult to grasp the position of the cursor 72. Thus, the snap controller 47 provides a function of moving the cursor 72 to the position of an object nearest from the present cursor 72 position upon receipt of an input from the square button 23.

Figure 20B:
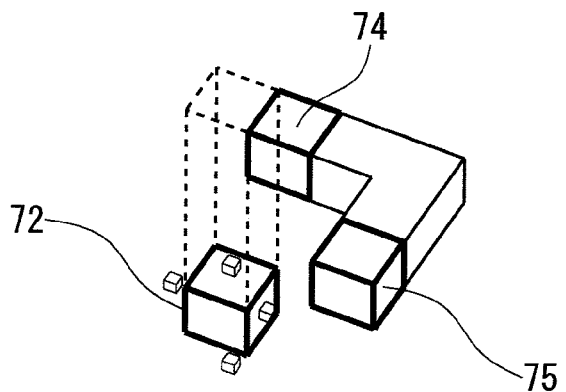
Figure 20C:
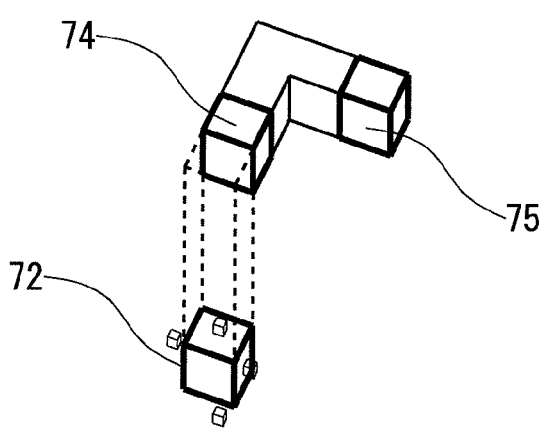
Figure 20D:
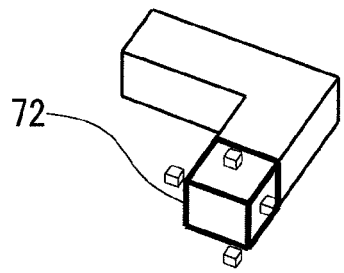

Referring to FIG. 20B where auxiliary lines are drawn and FIG. 20C where the point of view has been changed, it is found that the position of an object nearest from the cursor 72 position in the three-dimensional space is not a position 75 but a position 74. On the other hand, in the present embodiment, the cursor 72 is moved to the position 74 whose distance from the object is close thereto in appearance in the rendered two-dimensional plane instead of the position 75 based on the actual distance in the three-dimensional space. As a result, if the user moves the cursor 72 to a position close in appearance to an object to be snapped in the editing screen, even without accurately grasping the position of the cursor 72 in the three-dimensional space, and presses down on the square button 23, he/she can move the cursor 72 to a desired position. Hence, an interface that is easy to follow intuitively can be provided. Note that the snap controller 47 moves the cursor 72 to a position nearest in appearance to the present position when the square button 23 is depressed in the editing screen of FIG. 20C.

The snap controller 47 acquires coordinate values of the present position of the cursor 72 and the position of an object disposed, such as a block already disposed, in the two-dimensional plane rendered by the second rendering unit 43. Then the snap controller 47 determines an object whose distance from the present cursor 72 position is nearest in the two-dimensional plane, and reads out the position of the thus determined object in the three-dimensional space from the shape data storage 60 so as to move the cursor 72 to said position read out therefrom.

The present invention has been described based upon illustrative embodiments. These embodiments are intended to be illustrative only and it will be obvious to those skilled in the art that various modifications to the combination of constituting elements and processes could be developed and that such modifications are also within the scope of the present invention.

INDUSTRIAL APPLICABILITY

The present invention provides a game control technology that enhances the quality of entertainment.

The invention claimed is:

1. A game control program product embedded on a non-transitory computer-readable recording medium, comprising:
    a rendering module for setting a point of view and a line of sight and rendering an object disposed in a three-dimensional space by referencing data stored in a storage which stores data of the object disposed in the three-dimensional space;
    a module for receiving a change instruction indicating a change of the point of view or line of sight and changing the point of view or line of sight; and
    a module for shifting the point of view or line of sight to another position or another direction outside a predetermined range when the point of view or line of sight enters within the predetermined range.

2. A game control program product according to claim 1, wherein the objects include a plurality of parallelepipeds having sides respectively parallel with three axes of coordinate set in the three-dimensional space, and
    wherein when the line of sight enters within a predetermined range that contains a direction parallel or perpendicular to a base of the parallelepiped, the changing module changes the point of view or line of sight in a manner such that the line of sight is outside the predetermined range.

3. A game control program product comprising:
    a rendering module for setting a point of view and a line of sight and rendering an object disposed in a three-dimensional space by referencing data stored in a storage which stores data of the object disposed in the three-dimensional space;
    a changing module for receiving a change instruction indicating a change of the point of view or line of sight and changing the point of view or line of sight; and
    a module for moving a character along a plane that constitutes part of outer surface of the object,
    wherein the module for moving a character allows the character to move between two objects adjacent to each other in a two-dimensional plane generated by the rendering module, and
    wherein the changing module forbids the line of sight to be maintained in a state of being parallel or perpendicular to the plane for a predetermined length of time or over.

4. A game control program product according to claim 3, wherein the changing module ignores a change instruction to change the point of view or line of sight such that the line of sight becomes parallel or perpendicular to the plane.

5. A game control program product according to claim 3, wherein when the line of sight enters a predetermined range containing a direction parallel or perpendicular to the plane, the changing module changes the point of view or line of sight to outside the predetermined range.

6. A game control program product according to claim 3, wherein the objects include a parallelepiped having sides respectively parallel with three axes of coordinate set in the three-dimensional space,
    wherein the module for moving a character moves the character along an upper base of the parallelepiped, and
    wherein the changing module forbids the line of sight to be maintained in a state of being parallel or perpendicular to the upper base of the parallelepiped for a predetermined length of time or over.

7. A game control program product according to claim 3, wherein the rendering module renders the object through parallel projection transformation.

8. A game control program product according to claim 3, wherein when the character passes a position to which a function allowing the character to move in a direction away from the plane is assigned, the module for moving a character moves the character in the direction away from the plane; when the object exists in front of the position to which the function is assigned, viewed from the point of view, and is in a state where the position to which the function is assigned is not visible in the two-dimensional plane generated by the rendering module, the function is not effected and the character is moved along the plane.

9. A game device comprising:
a storage which stores data of an object disposed in a three-dimensional space;
a rendering unit which sets a point of view and a line of sight and renders the object disposed in the three-dimensional space by referencing the data stored in the storage; and
a change unit which receives a change instruction indicating a change of the point of view or line of sight and changes the point of view or line of sight,
wherein when the point of view or line of sight enters within a predetermined range, the change unit changes the point of view or line of sight to another position or another direction outside the predetermined range.

10. A game control method, executed by a computer, the method comprising:
setting a point of view and a line of sight and rendering an object disposed in a three-dimensional space by referencing data stored in a storage which stores data of the object disposed in the three-dimensional space, by a rendering unit in the computer;
receiving a change instruction indicating a change of the point of view or line of sight and changing the point of view or line of sight, by a change unit in the computer; and
shifting the point of view or line of sight to another position or another direction outside a predetermined range when the point of view or line of sight enters within the predetermined range, by the change unit.

11. A non-transitory computer-readable recording medium having the computer program product according to claim 1 stored thereon.

12. A game control program product embedded on a non-transitory computer-readable recording medium, comprising:
a rendering module for setting a point of view and a line of sight and rendering an object disposed in a three-dimensional space by referencing data stored in a storage which stores data of the object disposed in the three-dimensional space;
a module for receiving a change instruction indicating a change of the point of view or line of sight and changing the point of view or line of sight; and
a module for assigning any of directions parallel with three coordinate axes set in the three-dimensional space to directions allowed to be inputted by an input device that inputs a direction, respectively, and moving a pointer in the direction assigned to the inputted direction, upon receipt of an input of the direction from the input device.

13. A game control program product according to claim 12, wherein the module for moving the pointer assigns a direction whose angle formed with the respective directions allowed to be inputted by the input device is minimum, in a two-dimensional screen generated by the rendering module, to the direction inputted by the input device.

14. A game control program product according to claim 12, wherein the module for moving a pointer reevaluates, with predetermined timing, angles formed between the directions parallel with three coordinate axes and the directions allowed to be inputted by the input device, and changes the direction assigned to the direction inputted by the input device.

15. A game control program product according to claim 12, further comprising a module for displaying an object on the pointer or in the vicinity of the pointer in a state where a direction in which the pointer moves is identifiable.

16. A game control program product according to claim 12, wherein the rendering module renders the object through parallel projection transformation.

17. A game device comprising:
a storage which stores data of an object disposed in a three-dimensional space;
a rendering unit which sets a point of view and a line of sight and renders the object disposed in the three-dimensional space by referencing the data stored in the storage;
a change unit which receives a change instruction indicating a change of the point of view or line of sight and changes the point of view or line of sight; and
a control unit which assigns any of directions parallel with three coordinate axes set in the three-dimensional space to directions allowed to be inputted by an input device that inputs a direction, respectively, and moves a pointer in the direction assigned to the inputted direction, upon receipt of an input of the direction from the input device.

18. A game control method, executed by a computer, the method comprising:
setting a point of view and a line of sight and rendering an object disposed in a three-dimensional space by referencing data stored in a storage which stores data of the object disposed in the three-dimensional space, by a rendering unit in the computer;
receiving a change instruction indicating a change of the point of view or line of sight and changing the point of view or line of sight, by a change unit in the computer; and
assigning any of directions parallel with three coordinate axes set in the three-dimensional space to directions allowed to be inputted by an input device that inputs a direction, respectively, and moving a pointer in the direction assigned to the inputted direction, upon receipt of an input of the direction from the input device, by a control unit in the computer.

19. A non-transitory computer-readable recording medium having the computer program product according to claim 12 stored thereon.

* * * * *